(12) United States Patent
Maruyama et al.

(10) Patent No.: US 7,873,582 B2
(45) Date of Patent: Jan. 18, 2011

(54) MAZE CREATING METHOD, ANTENNA OPTIMUM DESIGNING METHOD, PROGRAM, AND ANTENNA, USING TWO-BIT/QUATERNARY CHROMOSOMES

(75) Inventors: Tamami Maruyama, Yokohama (JP); Fumio Kira, Yokohama (JP); Keizo Cho, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 871 days.

(21) Appl. No.: 10/586,396

(22) PCT Filed: Jan. 14, 2005

(86) PCT No.: PCT/IB2005/000078
§ 371 (c)(1), (2), (4) Date: May 29, 2007

(87) PCT Pub. No.: WO2005/083837
PCT Pub. Date: Sep. 9, 2005

(65) Prior Publication Data
US 2008/0055159 A1    Mar. 6, 2008

(30) Foreign Application Priority Data

| Jan. 15, 2004 | (JP) | ............................ 2004-008357 |
| Sep. 7, 2004 | (JP) | ............................ 2004-260318 |

(51) Int. Cl.
*G06F 15/18* (2006.01)
(52) U.S. Cl. ...................................................... 706/13

(58) Field of Classification Search .................... 706/13; 343/700 R, 700 MS, 702, 895
See application file for complete search history.

(56) References Cited

U.S. PATENT DOCUMENTS

| 6,567,049 B1 * | 5/2003 | Huang et al. .......... 343/700 MS |
| 2004/0001021 A1 * | 1/2004 | Choo et al. ........... 343/700 MS |

FOREIGN PATENT DOCUMENTS

| JP | 2001251134 | 9/2001 |
| JP | 2003-332814 | 11/2003 |
| WO | WO 03/052077 A2 | 6/2003 |

OTHER PUBLICATIONS

Jakiela et al., Continuum structural topology design with genetic algorithms, 1999, Elsevier Science S.A. pp. 339-356.*

(Continued)

*Primary Examiner*—David R Vincent
(74) *Attorney, Agent, or Firm*—Oblon, Spivak, McClelland, Maier & Neustadt, L.L.P.

(57) ABSTRACT

An antenna optimum design method according to this invention includes the steps of generating blocks by dividing a metal patch on an antenna element plane vertically and horizontally; setting reference point blocks in alternate blocks and assigning chromosomes to the reference point blocks; determining ways to arrange metal patches in blocks contiguous on one side to the reference point blocks, based on the chromosomes assigned to the reference point blocks; and searching for an optimum chromosomes to be assigned to the reference point blocks by a genetic algorithm to optimize antenna characteristics.

13 Claims, 23 Drawing Sheets

(a)

(b)

OTHER PUBLICATIONS

Villegas et al., A Parallel Electromagnetic Genetic-Algorithm Optimization (EGO) Application for PAtch Antenna Design, Apr. 25, 2003, Digital Oct. Identifier, 10.1109/TAP.2004.834071, pp. 2424-2435.*

Gaetano Marrocco, "Gain-Optimized Self-Resonant Meander Line Antennas for RFID Applications", IEEE Antennas and Wireless Propagation Letters, vol. 2, No. 1, XP-002428272, 2003, pp. 302-305.

J. Michael Johnson, et al., "Genetic Algorithms and Method of Moments (GA/MoM): A Novel Integration for Antenna Design", IEEE Antennas and Propagation Society International Symposium, vol. 3, XP-002428273, July 13, 1997, pp. 1664-1667.

Maruyama Tamami, et al., "A Study on a Design Method for Multi-Band Antenna by GA", The Institute of Electronics, Information and Communication Engineers, pp. 1-198 2003 (with English translation).

Ohira Masataka, et al., "An Analysis of Rectangular Waveguide With Arbitrarily-Shaped Iris", Technical Report of IBICE, pp. 25-30, 2003 (with English abstract and English translation).

Maloney, James C. et al., "Switched Fragmented Aperture Antennas", IEEE, vol. 1, pp. 310-313, 2000.

Xiao, Shaoqiu et al., " Reconfigurable Microstrip Antenna Design Based on Genetic Algorithm", IEEE, vol. 1, pp. 407-410, 2003.

Villegas, F. J. et al., "Parallel Genetic-Algorithm Optimization of A Dual-Band Patch Antenna for Wireless Communications", IEEE, vol. 1, pp. 334-337, 2002.

Urbani, F. et al., "Patch Antennas Loaded by Inhomogeneous Substrates: a Combined Spectral Domain-Genetic Algorithm Approach", ICECOM 2003 17$^{th}$ International Conference on Applied Electromagnetics and Communications, pp. 185-188, 2003.

Choo, H. et al., "Design of broadband and dual-band microstrip antennas on a high-dielectric substrate using a genetic algorithm", IEE Proc.-Microw. Antennas Propag., vol. 150, No. 3, pp. 137-142, 2003.

Li, Z., et al. "Frequency selective surface design by integrating optimisation algorithms with fast full wave numerical methods", IEE Proc.-Microw. Antennas Propag., vol. 149, No. 3, pp. 175-180, 2002.

Choo, H. et al., "Design of Multiband Microstrip Antennas Using a Genetic Algorithm", IEEE Microwave and Wirelss Components Letters, vol. 12, No. 9, pp. 345-347, 2002.

* cited by examiner

FIG.7
(a)
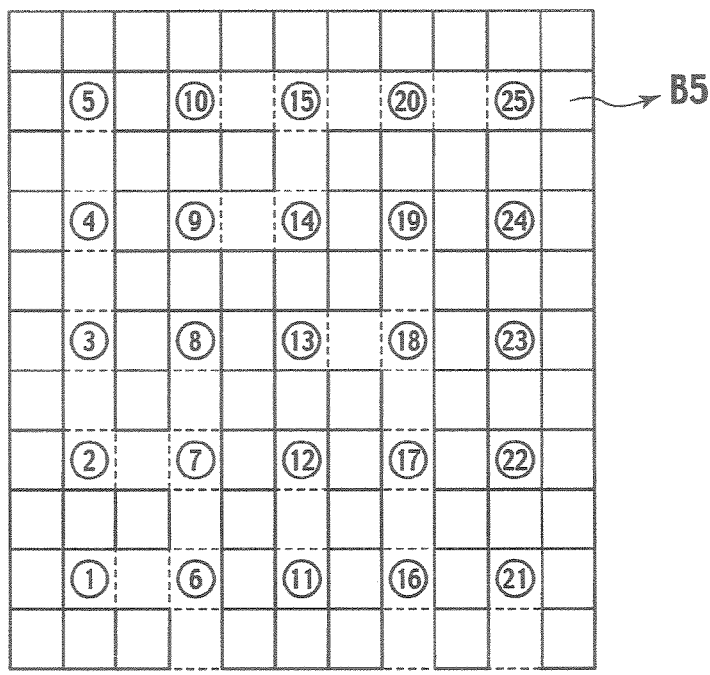
(b)
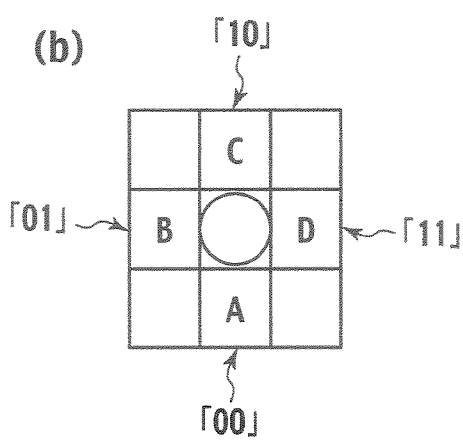
(c)
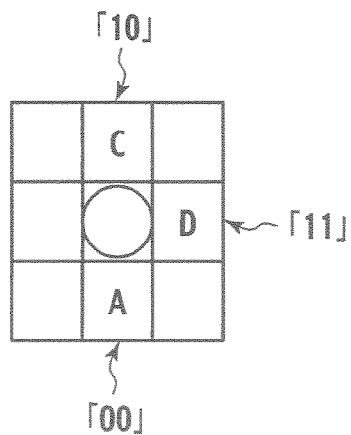
(d)
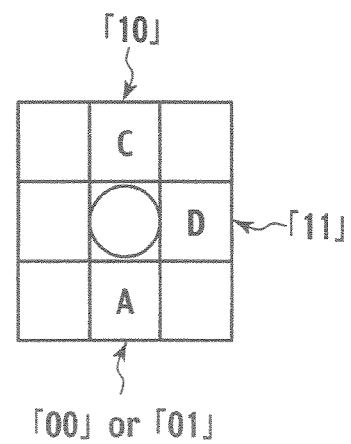

FIG.12
(a)
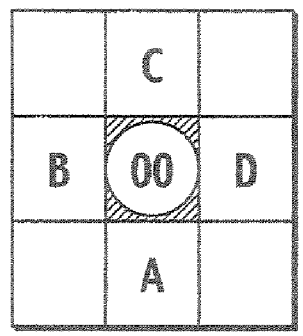
(b)
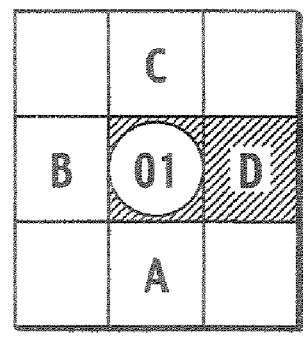
(c)
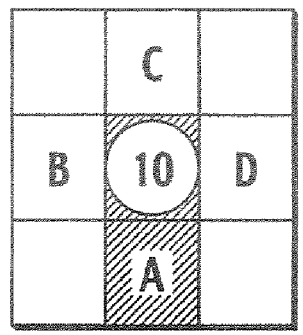
(d)
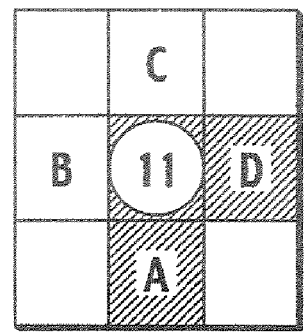

FIG.14
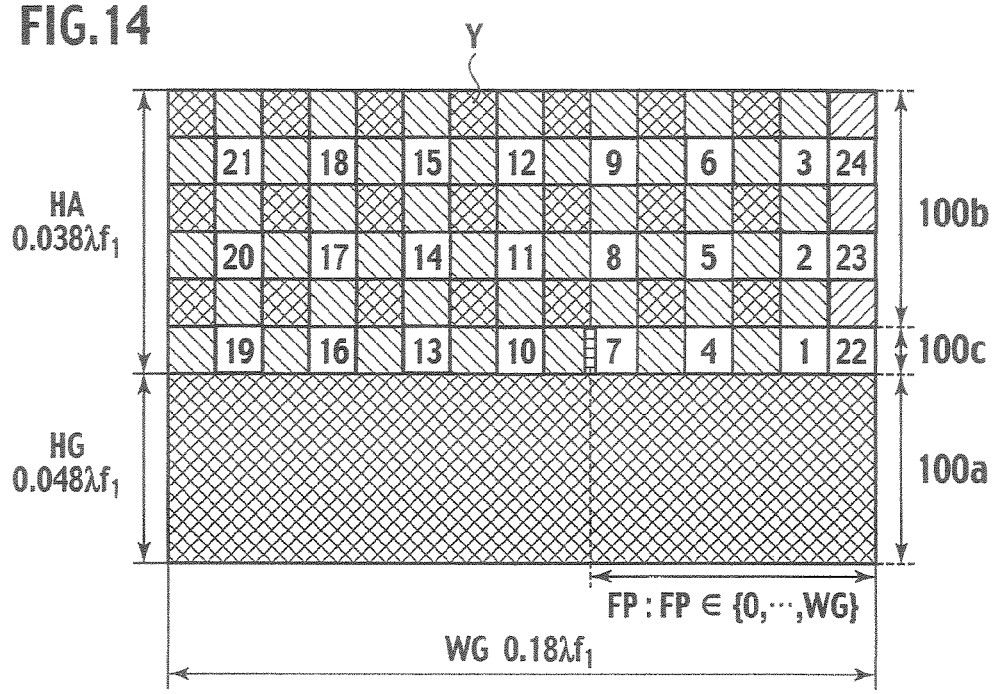
FIG.15
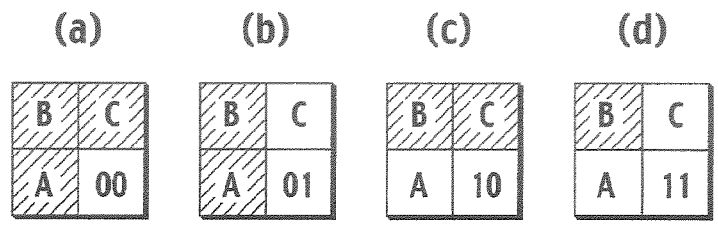
FIG.16

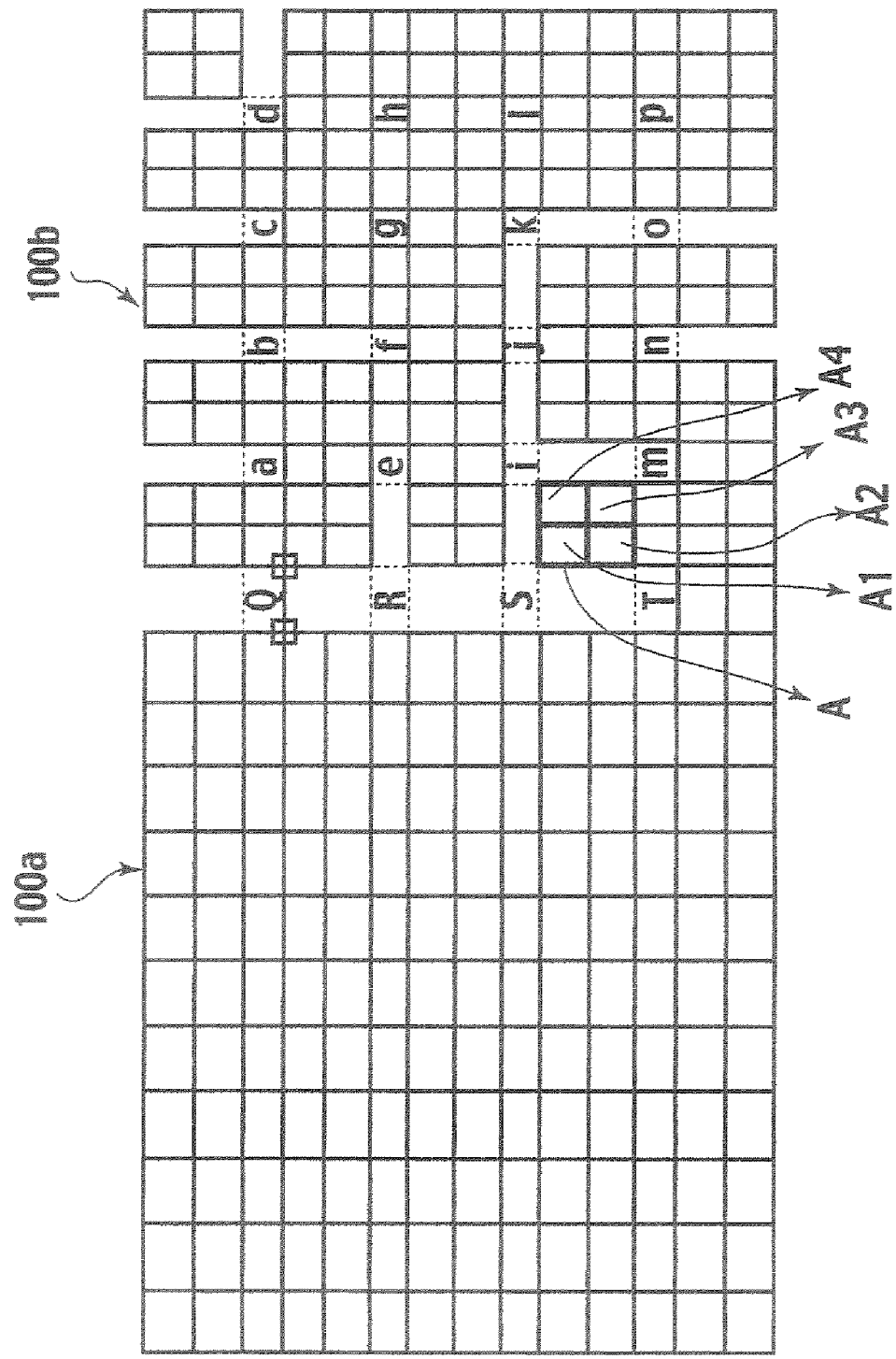

MAZE CREATING METHOD, ANTENNA OPTIMUM DESIGNING METHOD, PROGRAM, AND ANTENNA, USING TWO-BIT/QUATERNARY CHROMOSOMES

TECHNICAL FIELD

The present invention relates to antenna optimum design methods for designing the structure of an antenna having a structure in which metal patches are arranged on an antenna element plane, programs for implementing the antenna optimum design methods, and antennas designed by the antenna optimum design methods.

In particular, the present invention relates to antenna optimum design methods for designing the structures of planar inverted-F antennas, planar inverted-L antennas and meander-line antennas used as built-in antennas for mobile communications terminals in IMT-2000, and small multiband antennas including antennas for wireless LAN standardized by IEEE 802.11, programs for implementing the antenna optimum design methods, and antennas designed by the antenna optimum design methods.

BACKGROUND ART

There is a known conventional optimum design method for antennas having structures in which metal patches are arranged on an antenna element plane, which uses an antenna optimum design method for designing structures of microstrip antennas using a genetic algorithm shown in non-patent document 1.

This conventional antenna optimum design method will be described with reference to FIGS. 1A and 1B.

As shown in FIG. 1(a), the antenna includes a ground plane 100a with a metal surface, an antenna element plane 100b formed in parallel with the ground plane 100a and provided with a metal patch on a surface thereof, a feed point 100c connected to the ground plane 100a for feeding the metal patch on the antenna element plane 100b, and a short-circuit element 100d for short-circuiting the metal patch on the antenna element plane 100b and the metal surface on the ground plane 100a. The space between the ground plane 100a and the antenna element plane 100b is filled with air or dielectric.

Antennas according to the preset invention include every antenna having a structure in which metal patches (meander lines) are arranged on an antenna element plane, such as meander-line antennas, planar inverted-F antennas, planar inverted-L antennas, and small multiband antennas.

As shown in FIG. 1(b), the metal patch on the antenna element plane 100b is divided into a lattice of equal-sized blocks of a rectangular shape (including a square shape. The same below.). Next, a one-bit chromosome is assigned to each block. Then, it is determined whether to remove a metal patch in each block or not. For example, as shown in FIG. 1(b), a metal patch in a block whose chromosome is "0" is removed, while a metal patch in a block whose chromosome is "1" is not removed.

Accordingly, the conventional antenna optimum design method is configured to search for optimum chromosomes for making up an optimum antenna from among antennas of random shapes by a genetic algorithm using a given evaluation function.

In FIG. 1(b), the number of a metal patch is a unit number given to the metal patch.

There is another known conventional antenna optimum design method which uses a genetic algorithm as shown in patent document 1.

(Patent Document 1) Japanese Published Unexamined Application No. 2001-251134

(Non-patent Document 1) Tamami Maruyama, Keizo Cho, "Analysis of Design Method by GA for Multifrequency Shared Antenna", Society Conference of the Institute of Electronics, Information and Communication Engineers, 2003, B-1-198

(Non-patent Document 2) Masanori Ohira, Hiroyuki Deguchi, Mikio Tuzi, Hiroshi Kanizawa, "Analysis of Rectangular Waveguide with Binding Window of Random Shape", MW2003-212, pp. 25-30, 2003

However, a method using the conventional antenna optimum design method shown in the non-patent document 1 generates a structure in which two metal patches are in contact only at a vertex as shown in FIG. 1(b) (e.g., metal patches of unit numbers "B1" and "B2", and metal patches of unit numbers "B3" and "b4").

Antennas including such a structure generally have problems as described below:

(A) An extremely narrow width of a meander line at a contact between two metal patches makes a usable frequency bandwidth significantly narrow;

(B) When chromosomes are constituted by random numbers, a meander line is unlikely to have a continuous shape, and it takes time to calculate an optimum solution in a genetic algorithm;

(C) Manufacture using a drill or the like is impossible; and (D) Characteristic degradation due to manufacturing error is likely to occur.

Since such a structure is generated more frequently as the number of divisions of an antenna element plane constituting an antenna is increased, there is a problem that it is almost impossible to completely eliminate such a structure no matter how many times optimization by the genetic algorithm is repeated.

Also, the conventional antenna optimum design method shown in the patent document 1 did not mention an antenna optimizing method for designing meander-line antenna structures.

DISCLOSURE OF THE INVENTION

The present invention has been made in view of the above problems, and has an object of providing antenna optimum design methods which can exclude structures in which two metal patches are in contact only at a vertex, and can reduce the time of calculating optimum solutions of chromosomes for instructing ways to arrange metal patches, programs for implementing the antenna optimum design methods, and antennas designed by the antenna optimum design methods.

According to a first aspect of the present invention, there is provided a maze generation method for generating a maze, using a genetic algorithm, the method comprising the steps of generating blocks by dividing a given plane into given shapes; setting reference point blocks for setting walls in alternate blocks of the generated blocks; assigning, to the reference point blocks, chromosomes for determining ways to set walls in blocks contiguous on one side to the reference point blocks; and searching for an optimum chromosomes to be assigned to the reference point blocks by the genetic algorithm to generate an optimum maze.

According to a second aspect of the present invention, there is provided an antenna optimum design method for designing a structure of an antenna having a structure in which a metal patch is placed on an antenna element plane, using a genetic algorithm, the method comprising the steps of generating blocks by dividing the metal patch on the antenna element plane into given shapes; setting reference point blocks in alternate blocks of the generated blocks; assigning, to the reference point blocks, chromosomes for determining ways to arrange metal patches in blocks contiguous on one side to the reference point blocks; calculating characteristics of the antenna uniquely determined by the chromosomes; and searching for an optimum chromosomes to be assigned to the reference point blocks by the genetic algorithm to optimize the antenna characteristics.

In the second aspect of the present invention, it is possible that the antenna includes an unfed element plane formed in parallel with the antenna element plane, with a metal patch placed on a surface thereof, and the metal patches on the antenna element plane and the unfed element plane are divided into given shapes in the block generating step.

In the second aspect of the present invention, it is possible that the antenna includes a ground plane with a metal surface, a short-circuit element for short-circuiting the metal patch on the antenna element plane and the metal surface on the ground plane, and a feed point connected to the ground plane for feeding the metal patch on the antenna element plane, and the metal patch is placed in a block to which the short-circuit element and the feed point are connected.

In the second aspect of the present invention, it is possible that the antenna includes a ground plane with a metal surface, and a short-circuit element plane with a metal patch placed on a surface thereof, and the metal patch placed on the short-circuit element plane constitutes a short-circuit element for short-circuiting the metal patch on the antenna element plane and the metal surface on the ground plane, and the metal patches on the antenna element plane and the short-circuit element plane are divided into given shapes to generate blocks in the block generating step.

In the second aspect of the present invention, it is possible that the antenna includes a feed point with a central conductor connected to the metal patch on the antenna element plane and an outer conductor connected to the metal surface on the ground plane, and the chromosomes include a position coordinate of the feed point on the short-circuit element plane.

In the second aspect of the present invention, return loss characteristics and gain characteristics at multiple frequencies may be used as the antenna characteristics.

In the second aspect of the present invention, it is possible that when it is described that metal patches in all blocks surrounding a given block be removed in the step of determining ways to arrange metal patches, it is decided that a metal patch in the given block be removed.

In the second aspect of the present invention, it is possible that when it is decided that metal patches in all blocks surrounding a given block not be removed in the step of determining ways to arrange metal patches, it is decided that a metal patch in the given block be removed.

According to a third aspect of the present invention, there is provided a program for implementing an antenna optimum design method according to the second aspect of the present invention.

According to a fourth aspect of the present invention, there is provided an antenna designed by a antenna optimum design method according to the second aspect of the present invention.

BRIEF DESCRIPTION OF THE DRAWINGS

FIGS. 7(a) to 7(d) are diagrams for illustrating the operation of instructing ways to remove metal patches in blocks contiguous to the reference point blocks;

FIGS. 12(a) to 12(d) are diagrams for illustrating the operation of instructing ways to remove metal patches in blocks contiguous to the reference point blocks in the antenna optimum design method according to the second embodiment of the present invention;

FIG. 14 is a diagram showing the structure of an antenna according to a third embodiment of the present invention;

FIGS. 15(a) to 15(d) are diagrams for illustrating the operation of instructing ways to remove metal patches in blocks contiguous to reference point blocks in an antenna optimum design method according to the third embodiment of the present invention;

FIGS. 16(a) and 16(b) are diagrams for illustrating the operation of instructing ways to remove metal patches in blocks contiguous to reference point blocks in the antenna optimum design method according to the third embodiment of the present invention;

FIG. 26 is a diagram for illustrating an antenna optimum design method according to a modification of the present invention.

BEST MODE FOR CARRYING OUT THE INVENTION

First Embodiment

An antenna optimum design method according to a first embodiment of the present invention will be described with reference to FIGS. 2 to 8.

Figure 1:
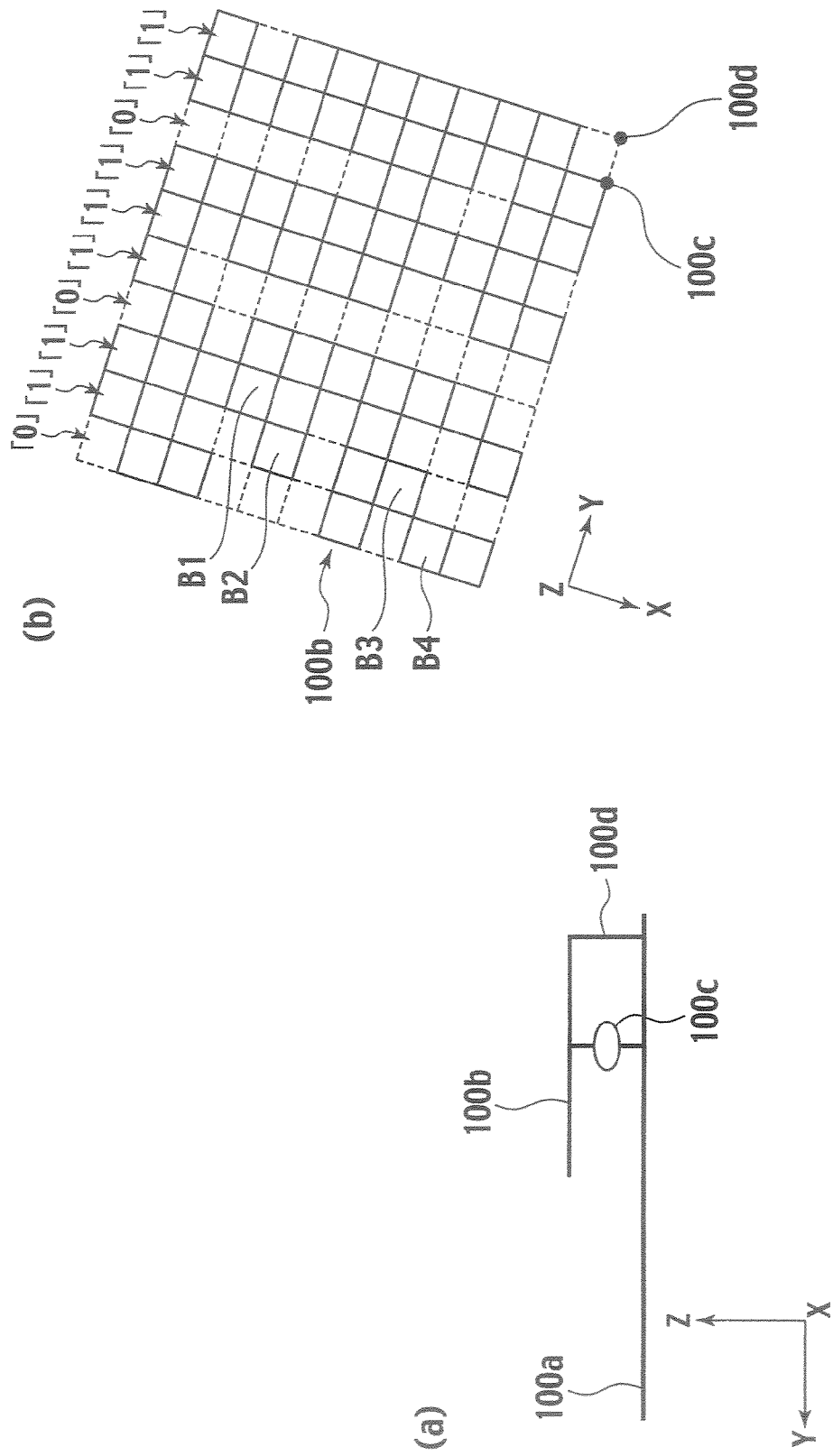
FIGS. 1(a) and 1(b) are diagrams showing the structure of a meander-line antenna designed by an antenna optimum design method according to a related art.
Figure 2:
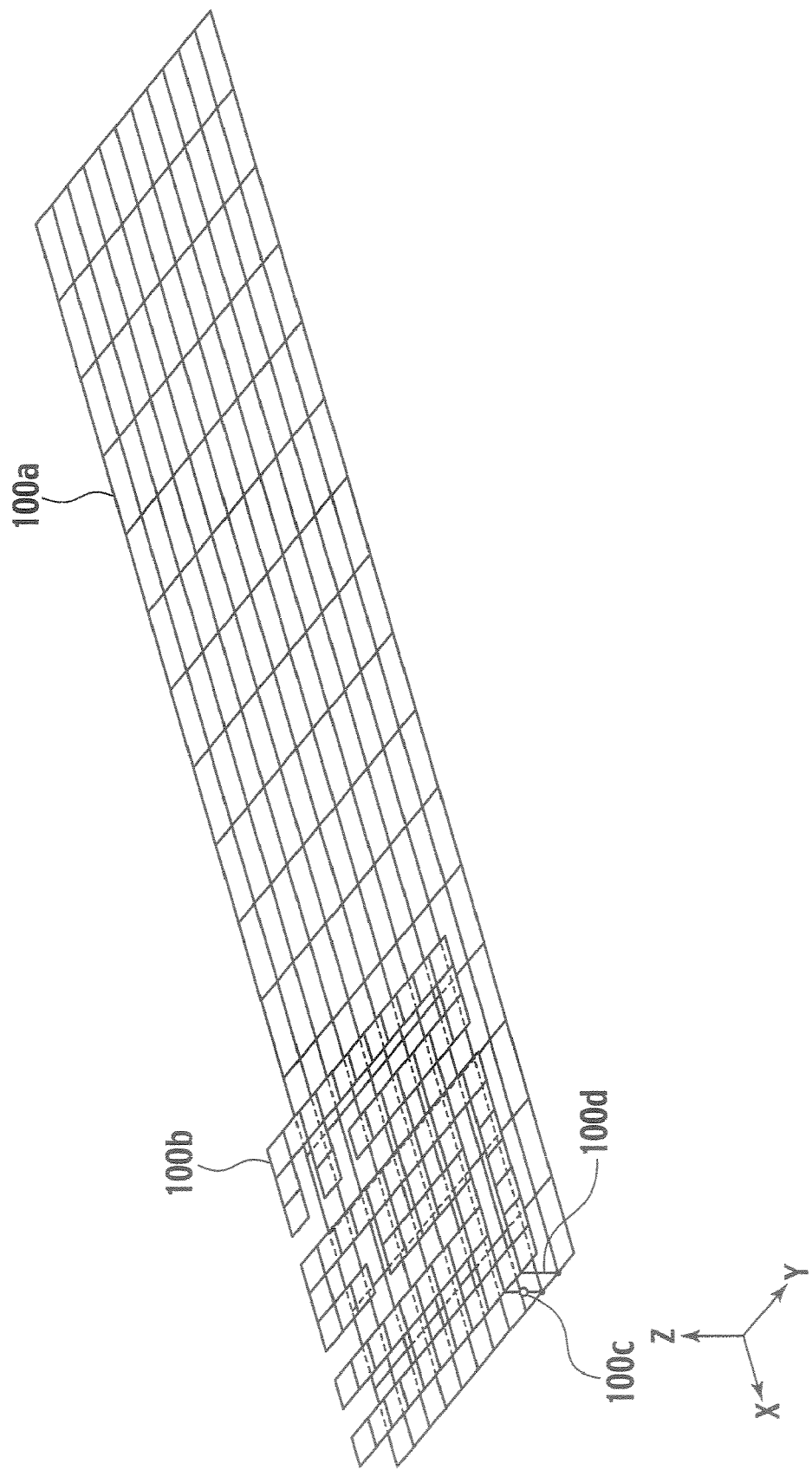
FIG. 2 is a diagram showing the structure of a meander-line antenna designed by an antenna optimum design method according to a first embodiment of the present invention.

FIG. 2 is a diagram showing the structure of an antenna (hereinafter, a meander-line antenna) designed by the antenna optimum design method according to this embodiment.

As shown in FIG. 2, the meander-line antenna according to this embodiment includes a ground plane 100a with a metal surface, an antenna element plane 100b formed in parallel with the ground plane 100a and provided with metal patches on a surface thereof, a feed point 100c connected to the ground plane 100a for feeding the metal patches on the antenna element plane 100b, and a short-circuit element 100d for short-circuiting the metal patches on the antenna element plane 100b and the metal surface on the ground plane 100a.

Figure 3:
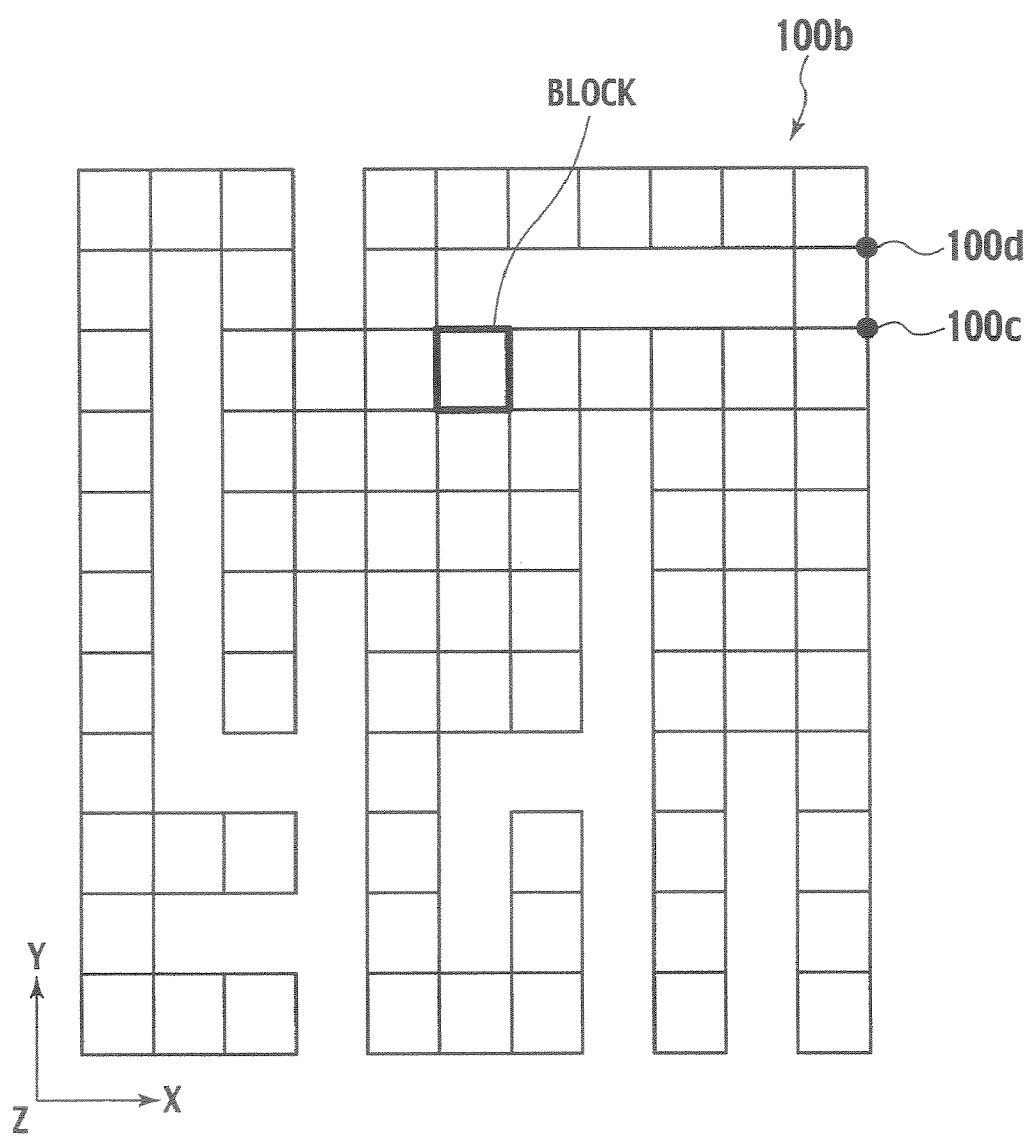
FIG. 3 is a detailed diagram of an antenna element plane of the meander-line antenna according to the first embodiment of the present invention.

FIG. 3 shows an example of a detailed structure of the antenna element plane 100b. FIG. 3 shows an example where a metal patch on the antenna element plane 100b is divided vertically into eleven and is also divided horizontally into eleven, thereby to generate 11×11 blocks. As shown in FIG. 3, the antenna element plane 100b in this embodiment has a meander-line shape with each block being contiguous to another block on one side, not at a point.

Figure 4:
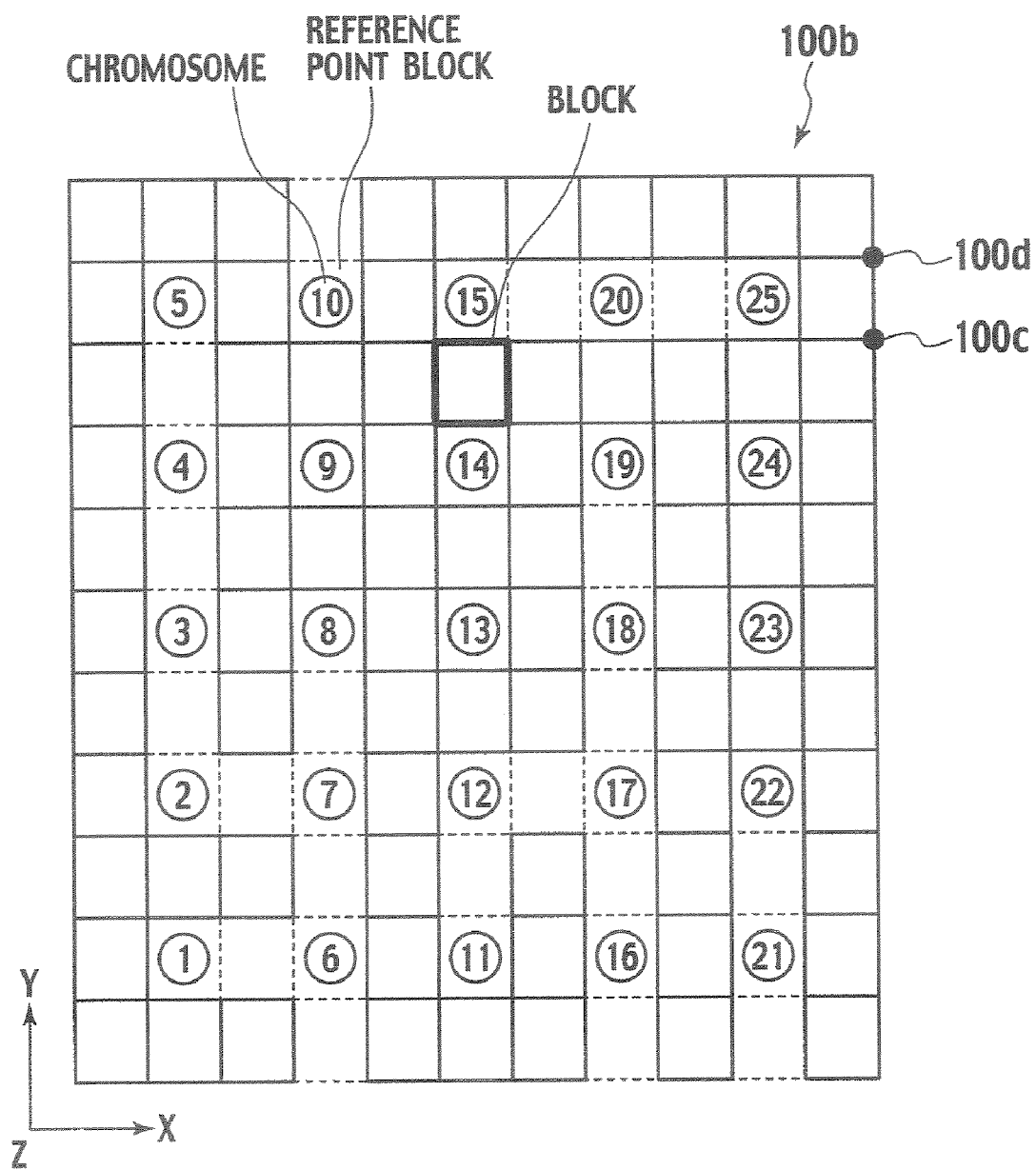
FIG. 4 is a diagram showing reference point blocks provided on the antenna element plane of the meander-line antenna according to the first embodiment of the present invention.

FIG. 4 is a diagram for illustrating reference point blocks set on the antenna element plane 100b. As shown in FIG. 4, the reference point blocks are set in alternate blocks of the blocks generated on the antenna element plane 100b.

Chromosomes to be optimized by a genetic algorithm are assigned to the reference point blocks. In an antenna optimum design method according to the related art, a one-bit (binary) chromosome is assigned to each block. In the antenna optimum design method according to this embodiment, a two-bit (quaternary) chromosome is assigned to a reference point block.

Such a chromosome instructs a way to arrange (way to remove or way to place) a metal patch in a block contiguous on one side to a reference point block to which the chromosome is assigned.

The antenna optimum design method of this embodiment has been invented with a "maze generation algorithm (pole knocking down method)" as a reference, and is novel in that it has devised how to combine chromosomes in a genetic algorithm with a "maze generation algorithm" and that this invention has been applied to automatic optimum design of meander-line antennas.

It should be noted that the "maze generation algorithm" is adopted here to randomly create continuous lines, and not to create a maze. It should be noted that the antenna optimum design method in this embodiment thus does not need to always use the "maze generation algorithm" without change, and can somewhat modify it.

With reference to FIGS. 5 to 7(a) to 7(d), operations of designing the meander-line antenna (antenna element plane 100b) by the antenna optimum design method in this embodiment will be described. Suppose that the surface of the antenna element plane 100b is covered by a metal patch (metal surface) in the initial state as shown in FIG. 6(a).

Figure 5:
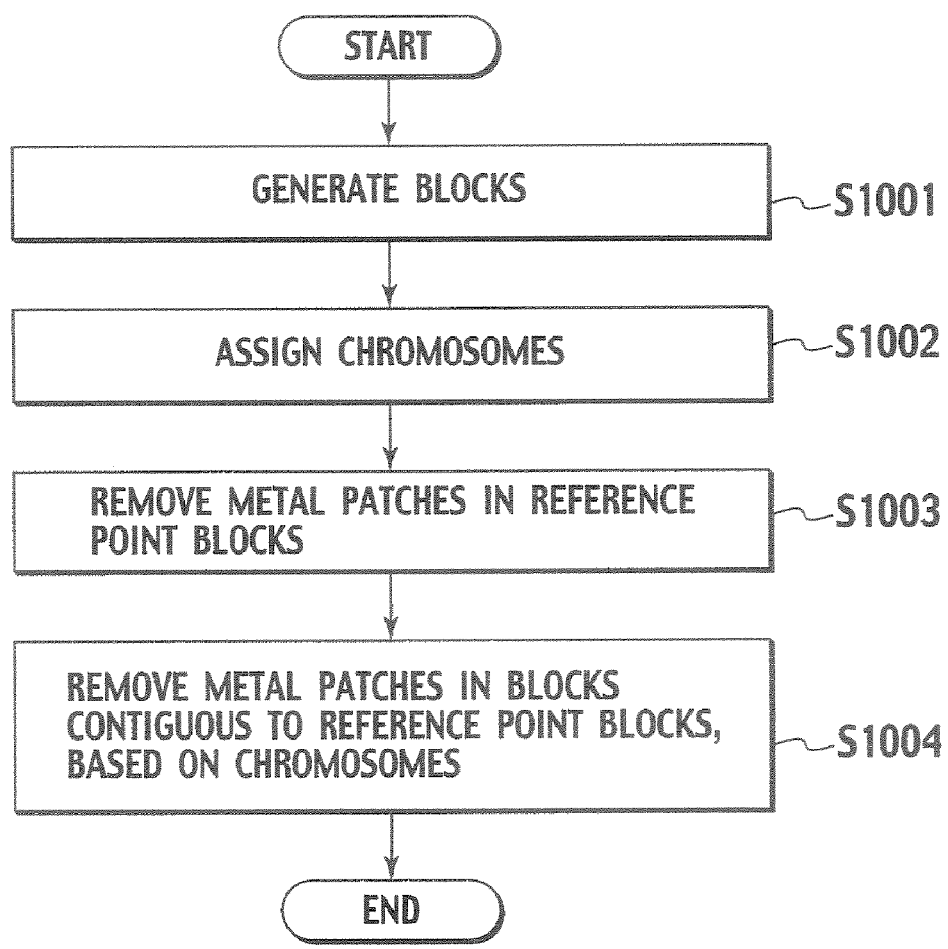
FIG. 5 is a flowchart showing operations of the antenna optimum design method according to the first embodiment of the present invention.
Figure 6:
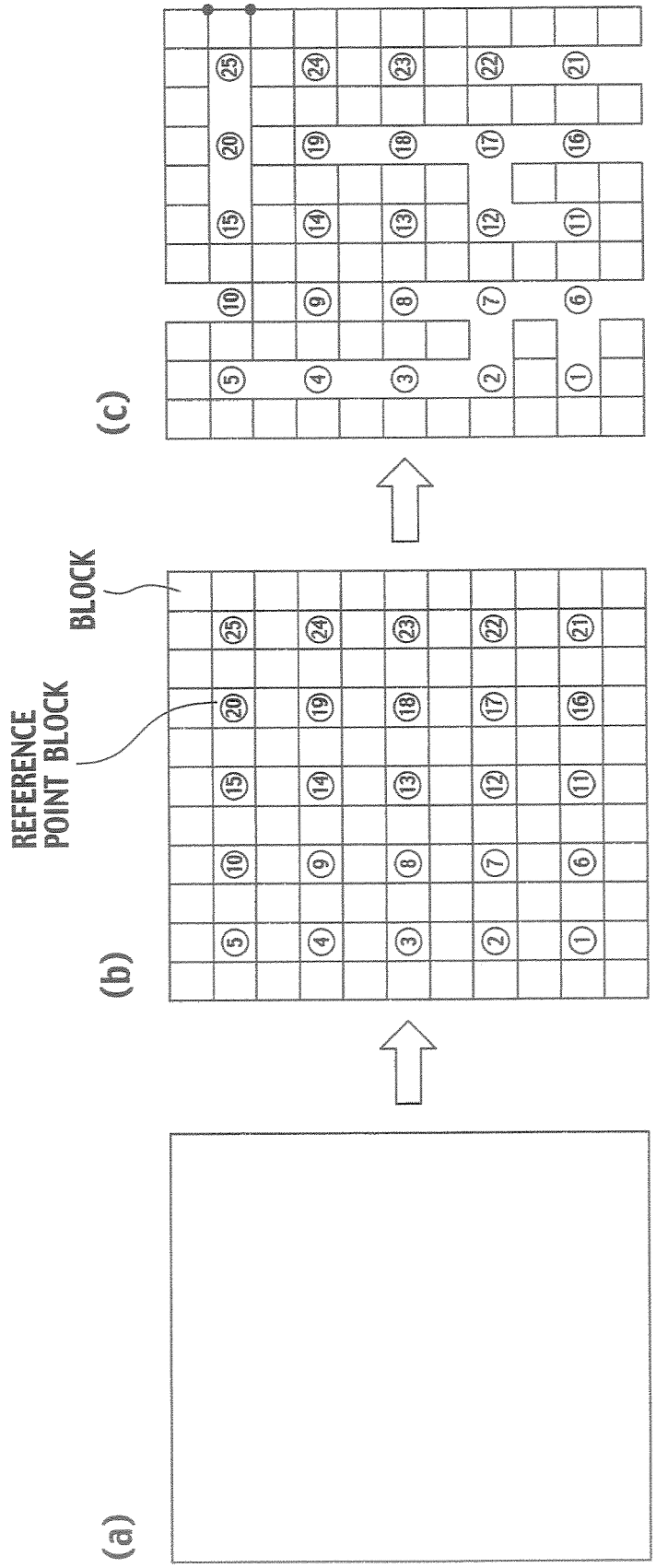
FIGS. 6(a) and 6(c) are diagrams for illustrating the operation of forming the antenna element plane in the antenna optimum design method according to the first embodiment of the present invention.

As shown in FIG. 5, in step S1001, the metal patch on the antenna element plane 100b is divided into given shapes (e.g., divided vertically into a three or more odd number and horizontally into a three or more odd number), to generate blocks. For example, as shown in FIG. 6(b), the metal patch on the antenna element plane 100b is divided into N×M (11×11 in the example of FIG. 6) rectangular blocks.

In step S1002, reference point blocks are set in alternate blocks of the generated blocks. Chromosomes are assigned to the reference point blocks. For example, as shown in FIG. 6(b), reference point blocks ("walls" in the maze generation algorithm) #1 to #21 are created in alternate blocks of the generated blocks, and a two-bit (quaternary) chromosome is assigned to each of the reference point blocks #1 to #21.

In step S1003, metal patches located in the reference point blocks are removed. In step S1004, ways to remove metal patches in blocks contiguous on one side to the reference point blocks #1 to #21 are determined, based on the chromosomes assigned to the reference point blocks #1 to #21. Then, as shown in FIG. 6(c), metal patches in blocks contiguous to the reference point blocks are removed sequentially according to the determined ways to remove, thereby to form meander lines on the antenna element plane 100b.

The metal patch removing process is not performed in a contiguous block whose metal patch has already been removed according to an instruction of a chromosome in another reference point block.

Now, a method of instructing the above-described ways to remove metal patches by chromosomes will be described with reference to FIGS. 7(a) to 7(d). Hereinafter, suppose that reference point blocks #1 to #25 are set on the antenna element plane 100b as shown in FIG. 7A. Two bits which can be included in such a chromosome are one of "00", "01", "10", and "11".

First, with reference to FIG. 7(b), description will be made of the case of chromosomes assigned to the reference point blocks #1 to #5 on the leftmost line of the reference point blocks shown in FIG. 7(a).

In this case, when a chromosome of "00" is assigned to a reference point block as shown in FIG. 7(b), a metal patch in a block A contiguous to the reference point block is removed.

Also, when a chromosome of "01" is assigned to a reference point block, a metal patch in a block B contiguous to the reference point block is removed.

Also, when a chromosome of "10" is assigned to a reference point block, a metal patch in a block C contiguous to the reference point block is removed.

Also, when a chromosome of "11" is assigned to a reference point block, a metal patch in a block D contiguous to the reference point block is removed.

Second, with reference to FIGS. 7(c) and 7(d), description will be made of the case of chromosomes assigned to the other reference point blocks #6 to #25.

In this case, as shown in FIGS. 7(c) and 7(d), when a chromosome of "00" is assigned to a reference point block, a metal patch in a block A contiguous to the reference point block is removed.

Also, when a chromosome of "10" is assigned to a reference point block, a metal patch in a block C contiguous to the reference point block is removed.

Also, when a chromosome of "11" is assigned to a reference point block, a metal patch in a block D contiguous to the reference point block is removed.

In addition, when a chromosome of "10" is assigned to a reference point block, a metal patch in every block contiguous to the reference point block may not be removed as shown in FIG. 7(c), or a metal patch in a block A (or C or D) contiguous to the reference point block may be removed as shown in FIG. 7(d).

In this embodiment, a metal patch in a portion connected to the short-circuit element 100d and the feed point 100c (block B5 shown in FIG. 7(a)) is always placed without being removed.

On the antenna element plane 100b of the meander-line antenna formed by the steps S1001 to S1004, all the blocks are contiguous to one another on a side, not at a vertex.

In the antenna optimum design method according to this embodiment, an optimum chromosome to be assigned to each reference point block is searched for by a genetic algorithm in order to optimize the characteristics of a meander-line antenna formed by the above-described steps S1001 to S1004.

That is, a genetic algorithm can be used to solve the problem of determining the shape of a maze (antenna element plane 100b) which maximizes (or minimizes) a given evaluation function, thereby to search for optimum chromosomes as described above.

Figure 8:
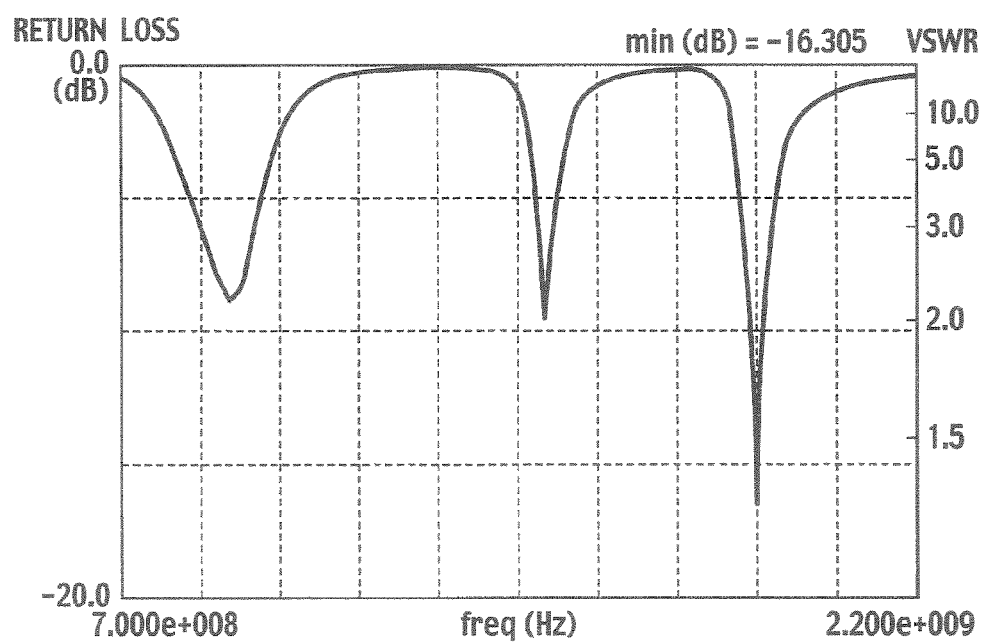
FIG. 8 is a graph showing the return loss characteristics of the meander-line antenna designed by the antenna optimum design method according to the first embodiment of the present invention.

FIG. 2 shows the finally formed structure of the antenna element plane 100b of the meander-line antenna when an evaluation function similar to that in the non-patent document 1 is used and an evaluation function which reduces return loss at three different frequencies, "first frequency f1: second frequency f2: third frequency f3" which are "0.9: 1.5: 1.9", is determined in the antenna optimum design method according to this embodiment. FIG. 8 shows the return loss characteristics in the meander-line antenna.

In this case, the condition that "the return loss is lower than or equal to −8 dB" at the three different frequencies f1, f2 and f3 is satisfied, as shown in FIG. 8. Also, it can be seen that the return loss is reduced also at frequencies near the frequencies f1, f2 and f3, and the frequency bandwidths are not narrowed.

The antenna optimum design method according to this embodiment is configured to remove metal patches in blocks contiguous on one side to the reference point blocks #1 to #21, and thus can solve the problem that an extremely narrow width of a meander line at a contact between two metal patches makes a usable frequency bandwidth significantly narrow.

Also, the antenna optimum design method according to this embodiment is configured to remove metal patches in blocks contiguous on one side to the reference point blocks #1 to #21, and thus allows manufacture using a drill or the like and reduces manufacturing error.

Also, in the antenna optimum design method according to this embodiment, a chromosome instructs a way to remove a metal patch in a block contiguous on one side to the reference point block, and therefore the time of calculating an optimum solution of a chromosome can be reduced as compared to the time of calculating an optimum solution of a chromosome which instructs whether to remove a metal patch in each block or not.

Second Embodiment

An antenna optimum design method according to a second embodiment of the present invention will be described with reference to FIGS. 9 to 13. Hereinafter, differences of the antenna optimum design method according to this embodiment from the antenna optimum design method according to the above-described first embodiment will be mainly described.

Figure 9:
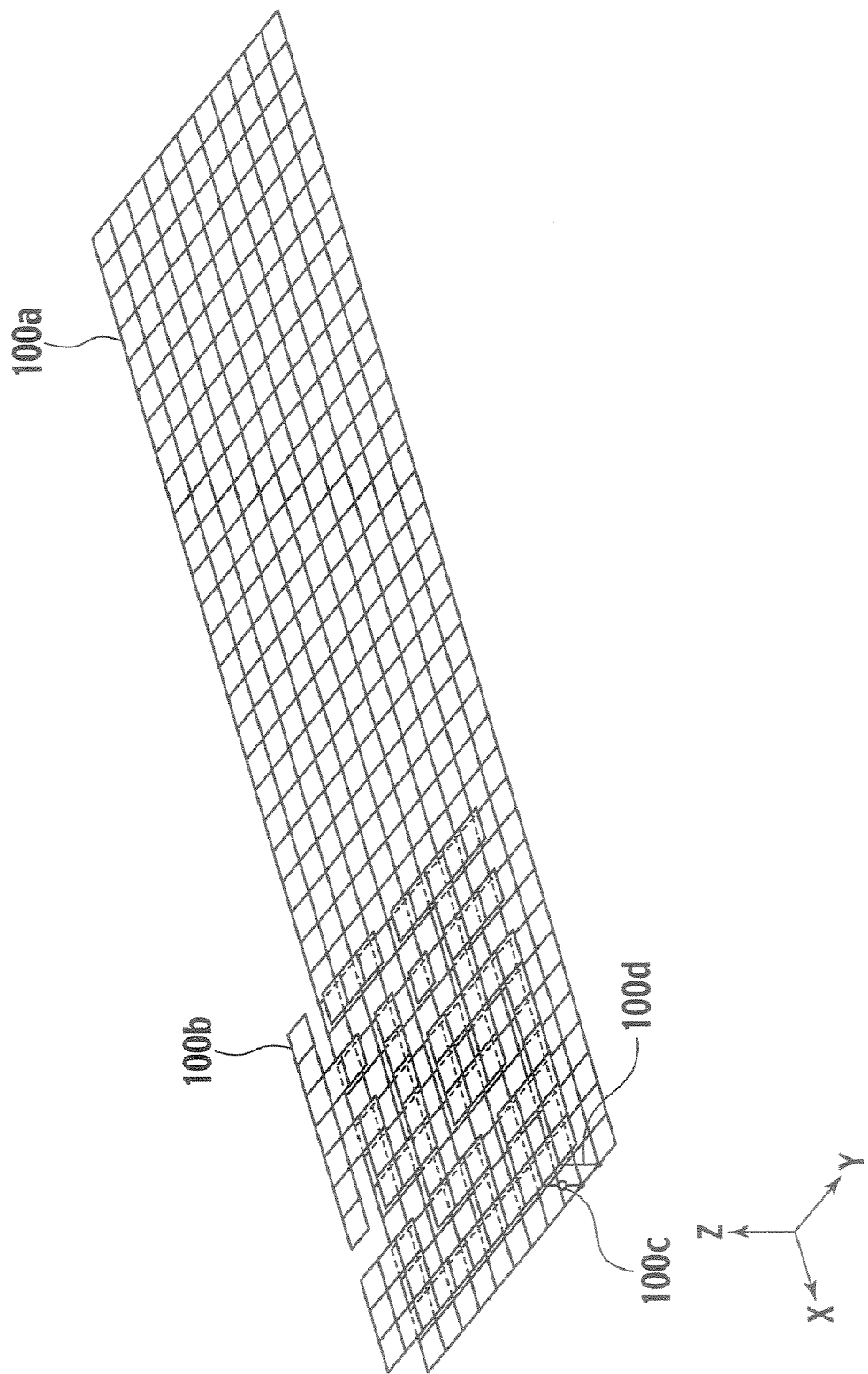
FIG. 9 is a diagram showing the structure of a meander-line antenna designed by an antenna optimum design method according to a second embodiment of the present invention.
Figure 10:
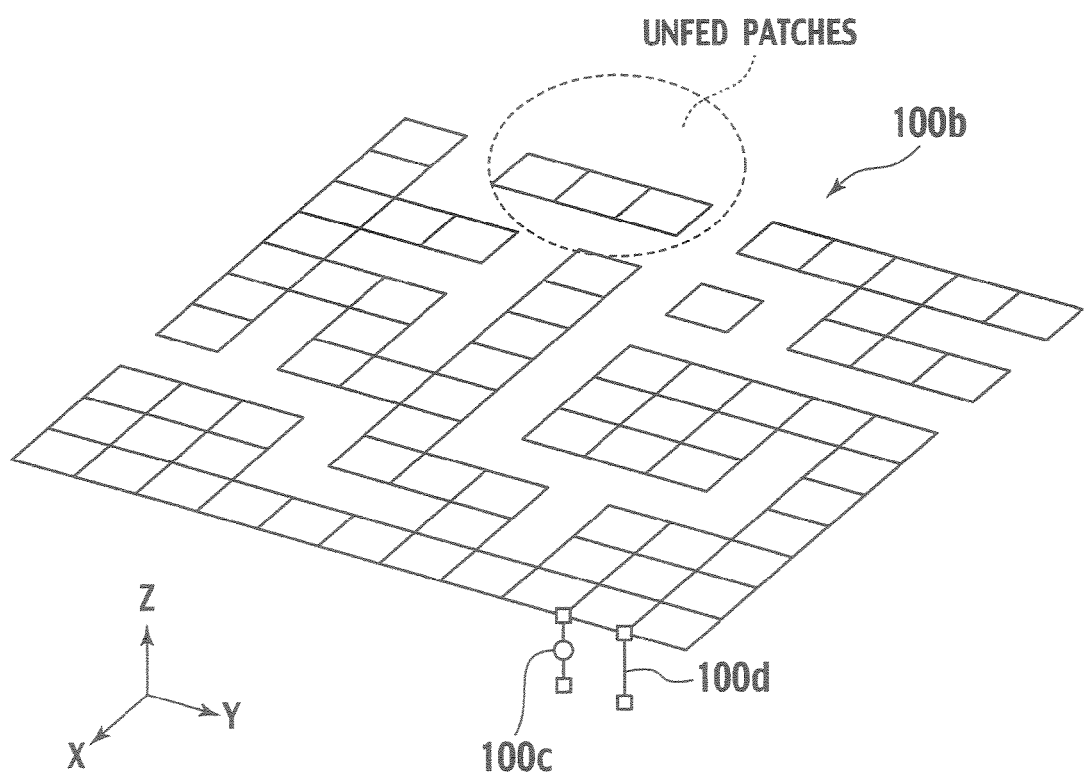
FIG. 10 is a detailed diagram of an antenna element plane of the meander-line antenna according to the second embodiment of the present invention.

FIG. 9 is a diagram showing the structure of a meander-line antenna designed by the antenna optimum design method according to this embodiment. FIG. 10 is a diagram for illustrating details of an antenna element plane of the meander-line antenna shown in FIG. 9.

As shown in FIG. 3, on the antenna element plane 100b of the meander-line antenna designed by the antenna optimum design method according to the first embodiment, a metal surface patch in every block is connected to a metal patch in another block on one side, and consequently is connected to the feed point 100c through a line. On an antenna element plane 100b of the meander-line antenna designed by the antenna optimum design method according to this embodiment, there are metal patches in an unfed state without a line connected to a feed point 100c (unfed patches, an unfed line or unfed element plane), as shown in an oval area by a broken line in FIG. 10.

Thus, the antenna optimum design method according to this embodiment is a method which is effective when optimally designing a meander-line antenna, including the effects of unfed patches.

Operations of designing a meander-line antenna (antenna element plane 100b) by the antenna optimum design method according to this embodiment will be described with reference to FIGS. 11 and 12(a) to 12(d). The antenna optimum design method according to this embodiment is identical to the antenna optimum design method according to the first embodiment except for a method of instructing ways to remove metal patches by chromosomes as described above.

Now, a method of instructing ways to remove metal patches by chromosomes as described above will be described. Hereinafter, suppose that reference point blocks #1 to #36 are set on the antenna element plane 100b as shown in FIG. 11.

Figure 11:
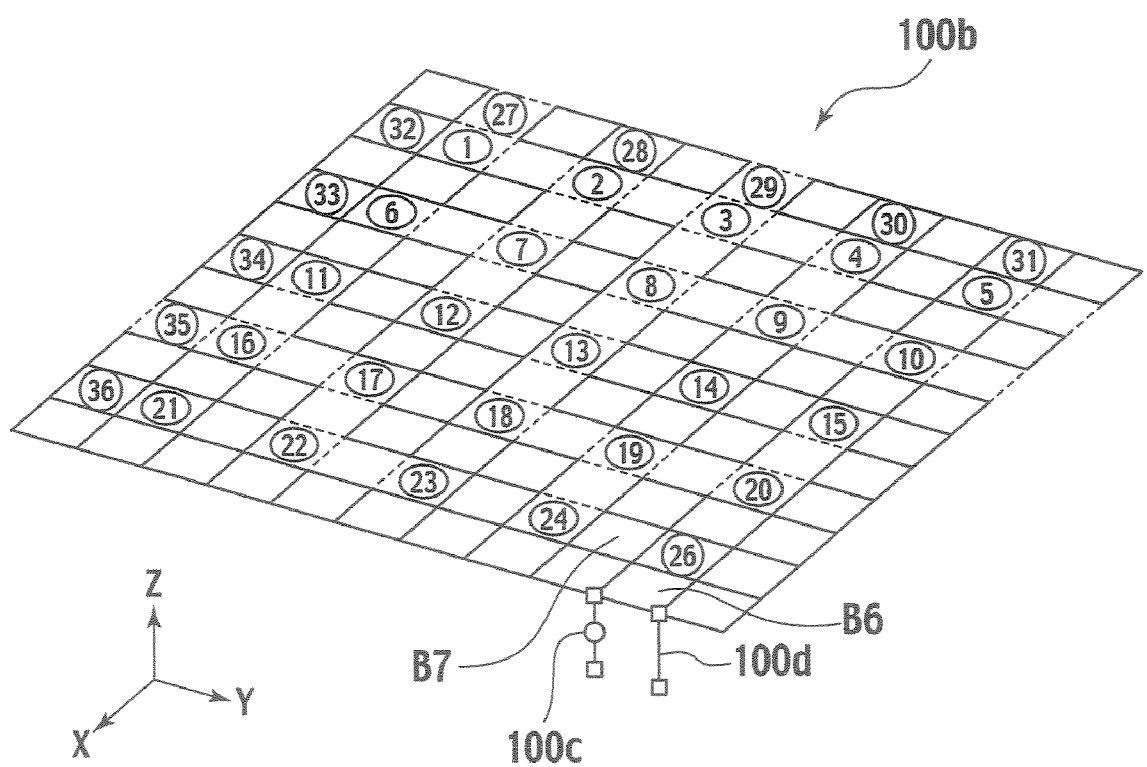
FIG. 11 is a diagram showing reference point blocks provided on the antenna element plane of the meander-line antenna according to the second embodiment of the present invention.

Chromosomes assigned to the reference point blocks #1 to #24 of the reference point blocks shown in FIG. 11 can include one of two bits "00", "01", "10" and "11".

Chromosomes assigned to the reference point blocks #27 to #36 of the reference point blocks shown in FIG. 11 can include one of one bit "0" and "1".

First, description will be made of the case of the chromosomes assigned to the reference point blocks #1 to #24 with reference to FIGS. 12(a) to 12(d).

In this case, when a chromosome of "00" is assigned to the reference point blocks #1 to #24, a metal patch in every block contiguous to the reference point blocks #1 to #124 is not removed as shown in FIG. 12(a).

When a chromosome of "01" is assigned to the reference point blocks #1 to #24, a metal patch in a block D contiguous to the reference point blocks #1 to #24 on the horizontally right side is removed as shown in FIG. 12(b).

When a chromosome of "10" is assigned to the reference point blocks #1 to #24, a metal patch in a block A contiguous to the reference point blocks #1 to #24 on the vertically lower side is removed as shown in FIG. 12(c).

When a chromosomes of "11" is assigned to the reference point blocks #1 to #24, metal patches in a block D contiguous to the reference point blocks #1 to #24 on the horizontally right side and in a block A contiguous to the reference point blocks #1 to #24 on the vertically lower side are removed as shown in FIG. 12(d).

That is, when the first bit of a chromosome assigned to the reference point blocks #1 to #24 is "0" (that is, "00" or "01"), a metal patch in a block contiguous to the reference point blocks #1 to #24 on one vertical side is removed. When the second bit of a chromosome assigned to the reference point blocks #1 to #24 is "0" (that is, "00" or "10"), a metal patch in a block contiguous to the reference point blocks #1 to #24 on one horizontal side is removed.

Second, description will be made of the case of the chromosome assigned to the reference point block #26. In the example of FIG. 11, suppose that the feed point 100c and a short-circuit element 100d are connected to a metal patch in a block B6 which is contiguous to the reference point block #26 on the vertically lower side. Therefore, it is supposed that the metal patch in the block B6 contiguous to the reference point block #26 on the vertically lower side is always placed without being removed.

That is, when a chromosome of "0" is assigned to the reference point block #26, a metal patch in a block B7 contiguous to the reference point block #26 on the horizontally left side is removed. When a chromosome of "1" is assigned to the reference point block #26, a metal patch in any block contiguous to the reference point block #26 is not removed.

Third, description will be made of the case of the chromosomes assigned to the reference point blocks #27 to #36 located on the vertically uppermost row and on the horizontally leftmost line of the antenna element plane 100b.

When a chromosome of "0" is assigned to the reference point blocks #27 to #36, a metal patch in the reference point blocks #27 to #36 is removed. When a chromosome of "1" is assigned to the reference point blocks #27 to #36, a metal patch in the reference point blocks #27 to #36 is not removed.

It is needless to say that the present invention can be implemented even when the right and the left and the top and the bottom are all reversed in this embodiment.

The antenna optimum design method according to this embodiment uses the idea of reference point blocks (walls) as in the case of the above-described "maze generation algorithm". However, in the antenna optimum design method according to this embodiment, it does not always necessary to reach a goal point from a starting point through one path as in the case of the "maze generation algorithm".

Therefore, it can be said that the antenna optimum design method according to this embodiment is improved so as to increase flexibility as compared to the "maze generation algorithm" and allow for existence of unfed lines or unfed patches.

Figure 13:
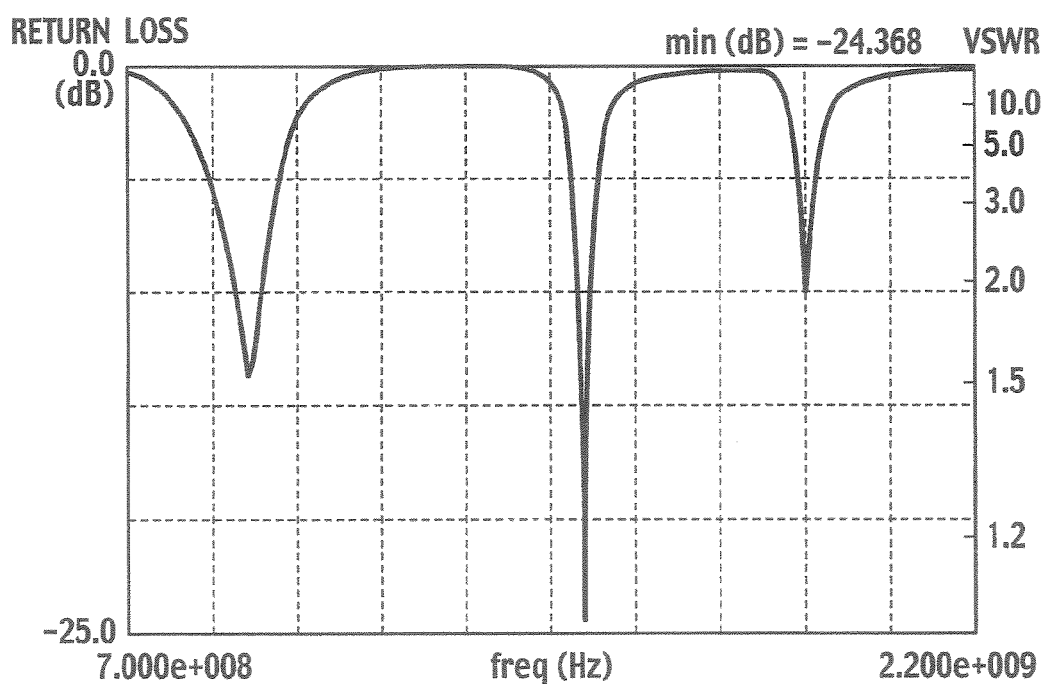
FIG. 13 is a graph showing the return loss characteristics of the meander-line antenna designed by the antenna optimum design method according to the second embodiment of the present invention.

FIG. 11 shows the finally formed structure of the antenna element plane 100b of the meander-line antenna when an evaluation function similar to that in the non-patent document 1 is used and an evaluation function which reduces return loss at three different frequencies, "first frequency f1: second frequency f2: third frequency f3" which are "0.9: 1.5: 1.9", is determined in the antenna optimum design method according to this embodiment. FIG. 13 shows the return loss characteristics in the meander-line antenna.

In this case, the conditions that "VSWR is lower than or equal to 2" and "the return loss is lower than or equal to −10 dB" at the three different frequencies f1, f2 and f3 are satisfied as shown in FIG. 13. Also, it can be seen that the return loss is reduced also at frequencies near the frequencies f1, f2 and f3, and the frequency bandwidths are not narrowed.

Third Embodiment

An antenna optimum design method according to a third embodiment of the present invention will be described with reference to FIGS. 14 to 18. Hereinafter, differences of the antenna optimum design method according to this embodiment from the antenna optimum design method according to the first embodiment will be mainly described.

As shown in FIG. 14, an antenna designed by the antenna optimum design method according to this embodiment has a ground plane 100a and an antenna element plane 100b which are provided in the same plane. The antenna also has an area provided between the ground plane 100a and the antenna element plane 100b, in which short-circuit elements 100d and a feed point 100c are arranged (short-circuit element plane 100e).

Here, the feed point 100c is configured so that a central conductor is connected to a metal patch on the antenna element plane 100b and an outer conductor is connected to a metal surface on the ground plane 100a. The short-circuit elements 100d are configured to short-circuit the metal patch on the antenna element plane 100b and the metal surface on the ground plane 100a.

Operations of designing a meander-line antenna (antenna element plane 100b, short-circuit element plane and feed point plane) by the antenna optimum design method according to this embodiment will be described with reference to FIGS. 14 to 16(a) and 16(b). The antenna optimum design method according to this embodiment is identical to the antenna optimum design method according to the first embodiment except for a method of instructing ways to remove metal patches by chromosomes as described above.

Now, a method of instructing ways to remove metal patches by chromosomes as described above will be described. Hereinafter, suppose that reference point blocks #1 to #24 are set on the antenna element plane 100b as shown in FIG. 14.

Chromosomes assigned to the reference point blocks #1 to #21 of the reference point blocks shown in FIG. 14 can include one of two bits "00", "01", "10", and "11".

Chromosomes assigned to the reference point blocks #22 to #24 of the reference point blocks shown in FIG. 14 can include one of one bit "0" and "1".

First, description will be made of the case of the chromosomes assigned to the reference point blocks #1 to #21 with reference to FIGS. 15(a) to 15(d).

In this case, when a chromosome of "00" is assigned to the reference point blocks #1 to #21, a metal patch in every block contiguous to the reference point blocks #1 to #21 is not removed as shown in FIG. 15(a).

When a chromosome of "01" is assigned to the reference point blocks #1 to #21, a metal patch in a block C contiguous to the reference point blocks #1 to #21 on the vertically upper side is removed as shown in FIG. 15(b).

When a chromosome of "10" is assigned to the reference point blocks #1 to #21, a metal patch in a block A contiguous to the reference point blocks #1 to #21 on the horizontally left side is removed as shown in FIG. 15(c).

When a chromosome of "11" is assigned to the reference point blocks #1 to #21, metal patches in a block A contiguous to the reference point blocks #1 to #21 on the horizontally left side and in a block C contiguous to the reference point blocks #1 to #21 on the vertically upper side are removed as shown in FIG. 15D.

Second, description will be made of the case of the chromosomes assigned to the reference point blocks #22 to #24 located on the horizontally rightmost line of the antenna element plane 100b.

When a chromosome of "0" is assigned to the reference point blocks #22 to #24, a metal patch in the reference point blocks #22 to #24 is removed. When a chromosome of "1" is assigned to the reference point blocks #22 to #24, a metal patch in the reference point blocks #22 to #24 is not removed.

In the antenna optimum design method according to this embodiment, reference blocks are set not only on the antenna element plane 100b but also on the short-circuit element plane 100e which is a boundary area between the antenna element plane 100b and the ground plane 100a.

Consequently, the number of the short-circuit elements 100d for short-circuiting the antenna element plane 100b and the ground plane 100a can be selected at random (in the example of FIG. 14, any number from zero to eight of short-circuit elements 100d can be selectively provided). Accordingly, the antenna optimum design method according to this embodiment facilitates creation of planar inverted-F antennas and planar inverted-L antennas.

The antenna optimum design method according to this embodiment may be configured so that the position coordinate FP of the feed point 100c on the short-circuit element plane 100e is included in a chromosome used by a genetic algorithm to be described below.

Consequently, the feed point 100c can be provided in a position to optimize the antenna characteristics by the genetic algorithm.

Also, the antenna optimum design method according to this embodiment is configured so that a metal patch is always placed in a block which is not contiguous on one side to any reference point block (e.g., a block Y in FIG. 14).

This seems to impose constraints on the degree of freedom in the antenna structure, limiting the antenna structure obtained as an optimum solution.

However, as shown in FIG. 16(a), when it is decided that metal patches in all blocks surrounding a given block A not be removed, the block A can be equated with a block in which a metal patch is placed.

In particular, when a method such as the moment method or the FDTD method for wire grid model, in which it is supposed that an electric current flows on wire, is used as an analysis method, the two models in FIG. 16(a) becomes exactly the same analytical model.

Consequently, when it is decided that metal patches in all blocks surrounding a given block A not be removed in the antenna optimum design method according to this embodiment, it can be decided that a metal patch (isolated patch) in the given block A not be removed.

Also, when it is decided that metal patches in all blocks surrounding a given block B be removed as shown in FIG. 16(b) and the block size is sufficiently small (that is, the mesh is sufficiently fine), removal of a metal patch in the given block B hardly affects the antenna characteristics because the effect of an electric current flowing therethrough is small.

Therefore, in the antenna optimum design method according to this embodiment, when it is decided that the metal patches in all the blocks surrounding the given block B be removed, it can be decided that a metal patch (isolated patch) in the given block B be removed.

Figure 17:
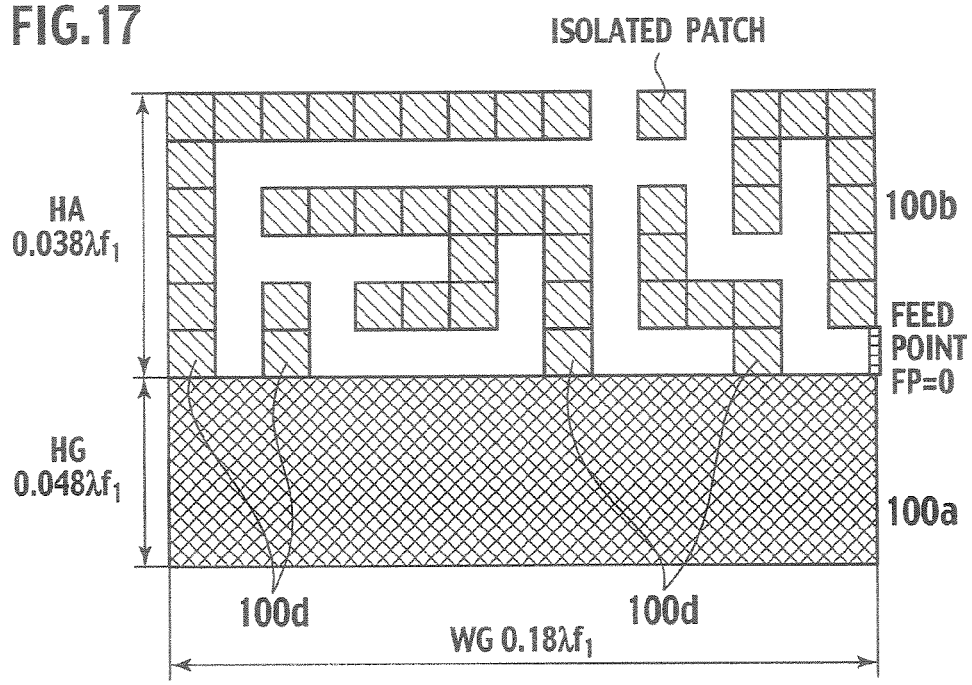
FIG. 17 is a diagram showing the structure of a meander-line antenna designed by the antenna optimum design method according to the third embodiment of the present invention.
Figure 18:
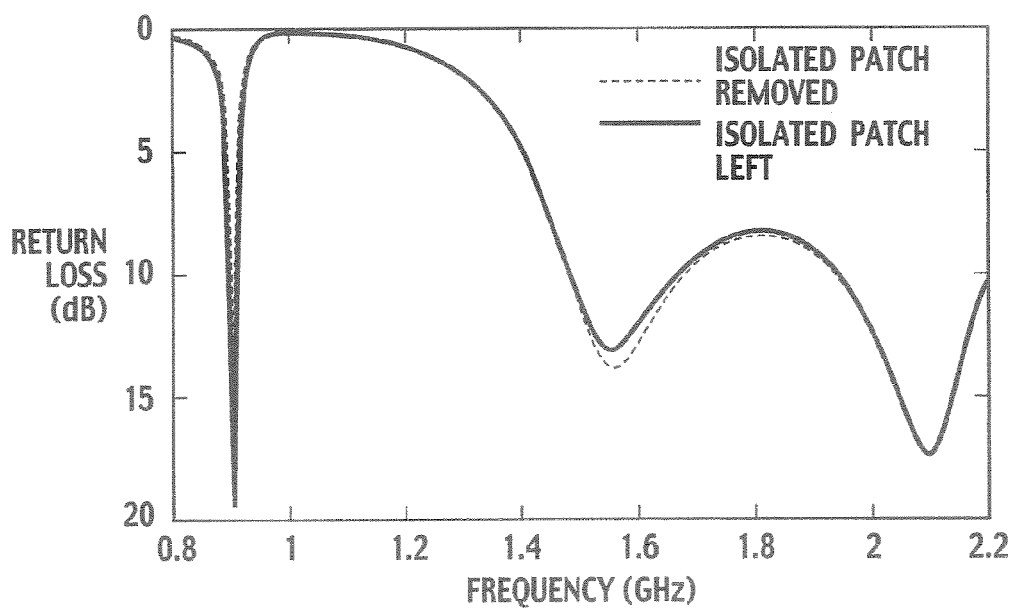
FIG. 18 is a graph showing the return loss characteristics of the meander-line antenna designed by the antenna optimum design method according to the third embodiment of the present invention.

FIG. 17 shows the finally formed structure of the antenna when antenna design is performed using a genetic algorithm, including the condition that it oscillates at three frequencies, 900 MHz, 1.5 GHz and 2.0 GHz, using an evaluation function similar to that in the first and second embodiments. FIG. 18 shows the return loss characteristics in the antenna.

In this case, a planar inverted-L antenna changed into a meander line shape is designed as shown in FIG. 17, in which the number of short-circuit elements 100d is "4", and the static point 100c is placed at the edge of the feed element plane 100e. This antenna does not include only vertex-to-vertex intersections.

In this case, as shown in FIG. 18, it oscillates at the desired three frequencies, 900 MHz, 1.5 GHz and 2.0 GHz, satisfying a return loss of more than or equal to 10 dB.

In FIG. 18, the return loss characteristics when an isolated patch as described above is removed are shown by a broken line, and the return loss characteristics when an isolated patch as described above is left are shown by a solid line. It can be seen that the return loss characteristics in the two cases differ little.

The antenna optimum design method according to this embodiment allows for changing the position of a short-circuit element and the position of a feed point at will.

Figure 21:
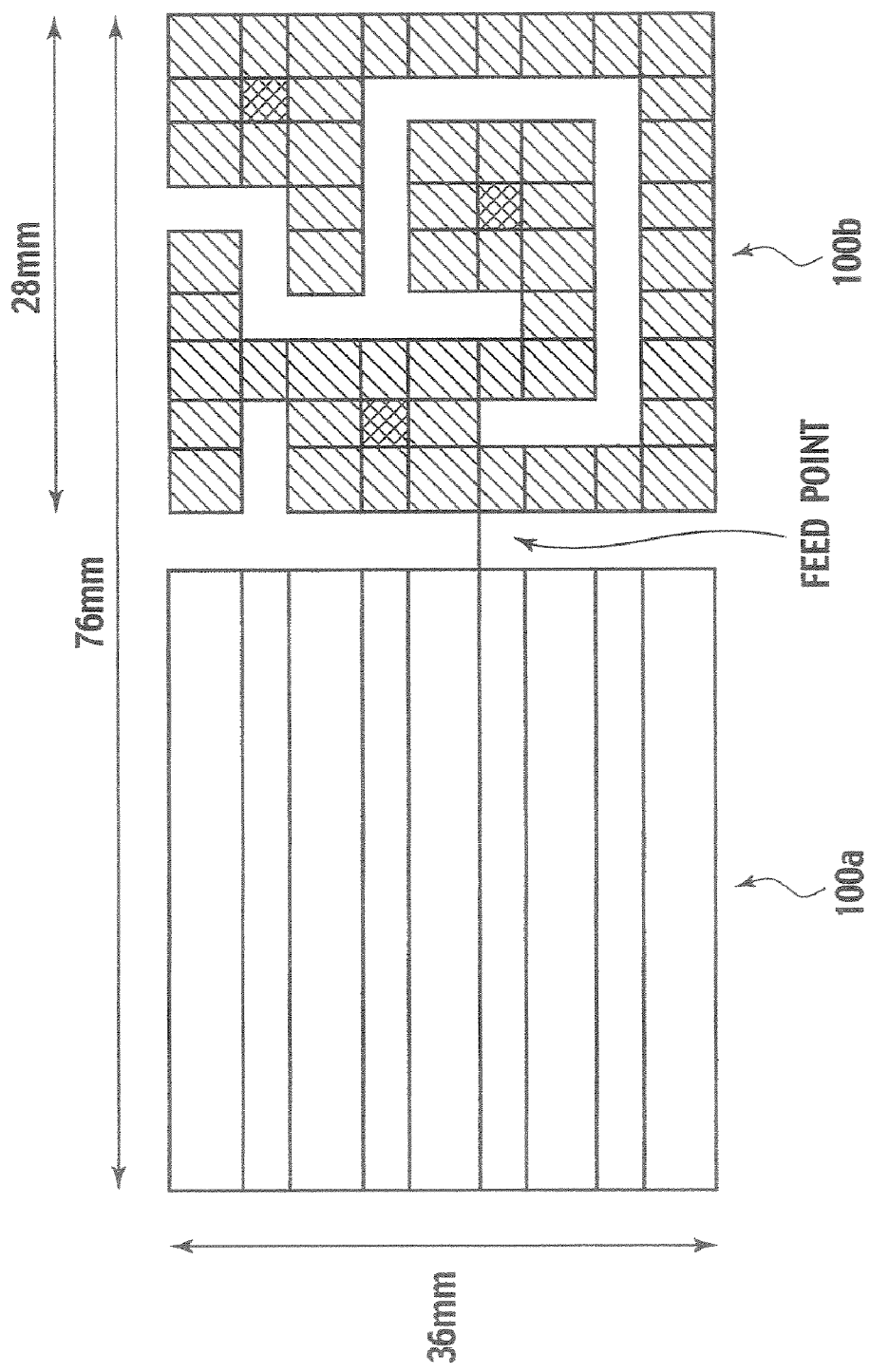
FIG. 21 is a diagram showing an example of an antenna optimized in the antenna optimum design method according to the third embodiment of the present invention.
Figure 22:
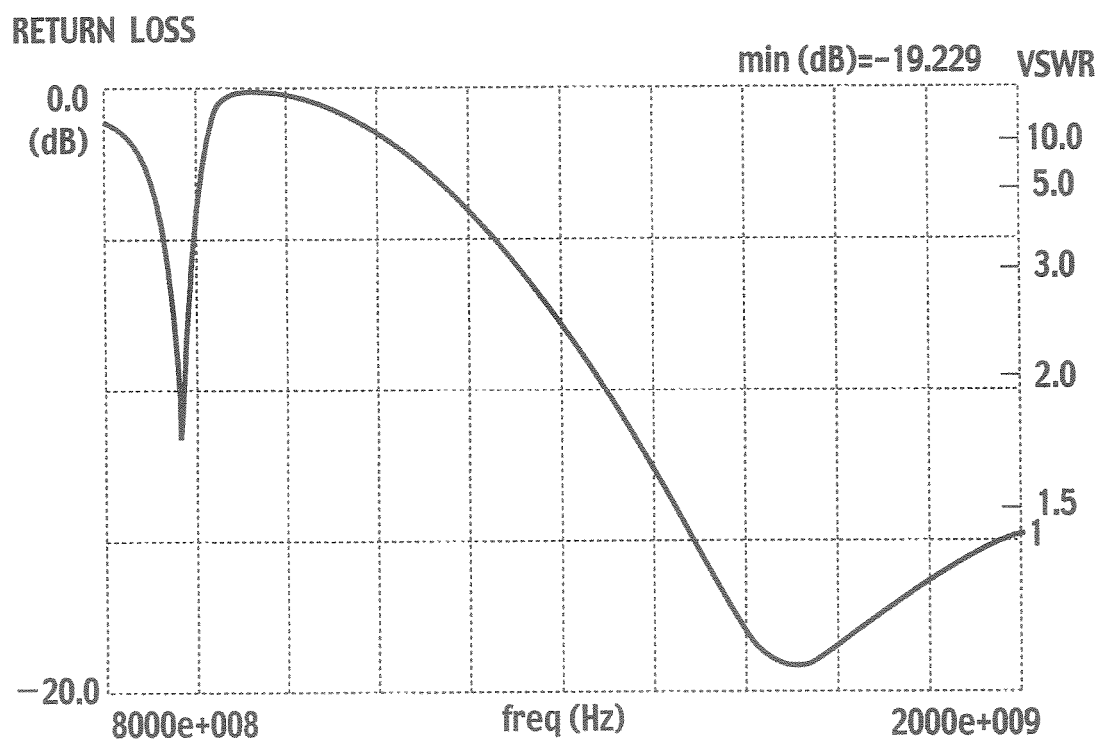
FIG. 22 is a graph showing the characteristics of the antenna optimized in the antenna optimum design method according to the third embodiment of the present invention.

FIG. 21 shows an example where an antenna of a size of 36 mm×76 mm (an antenna with a ground plane 100a and an antenna element plane 100b provided in the same plane) is optimized by the antenna optimum design method according to this embodiment. FIG. 22 shows the characteristics of the antenna.

Figure 23:
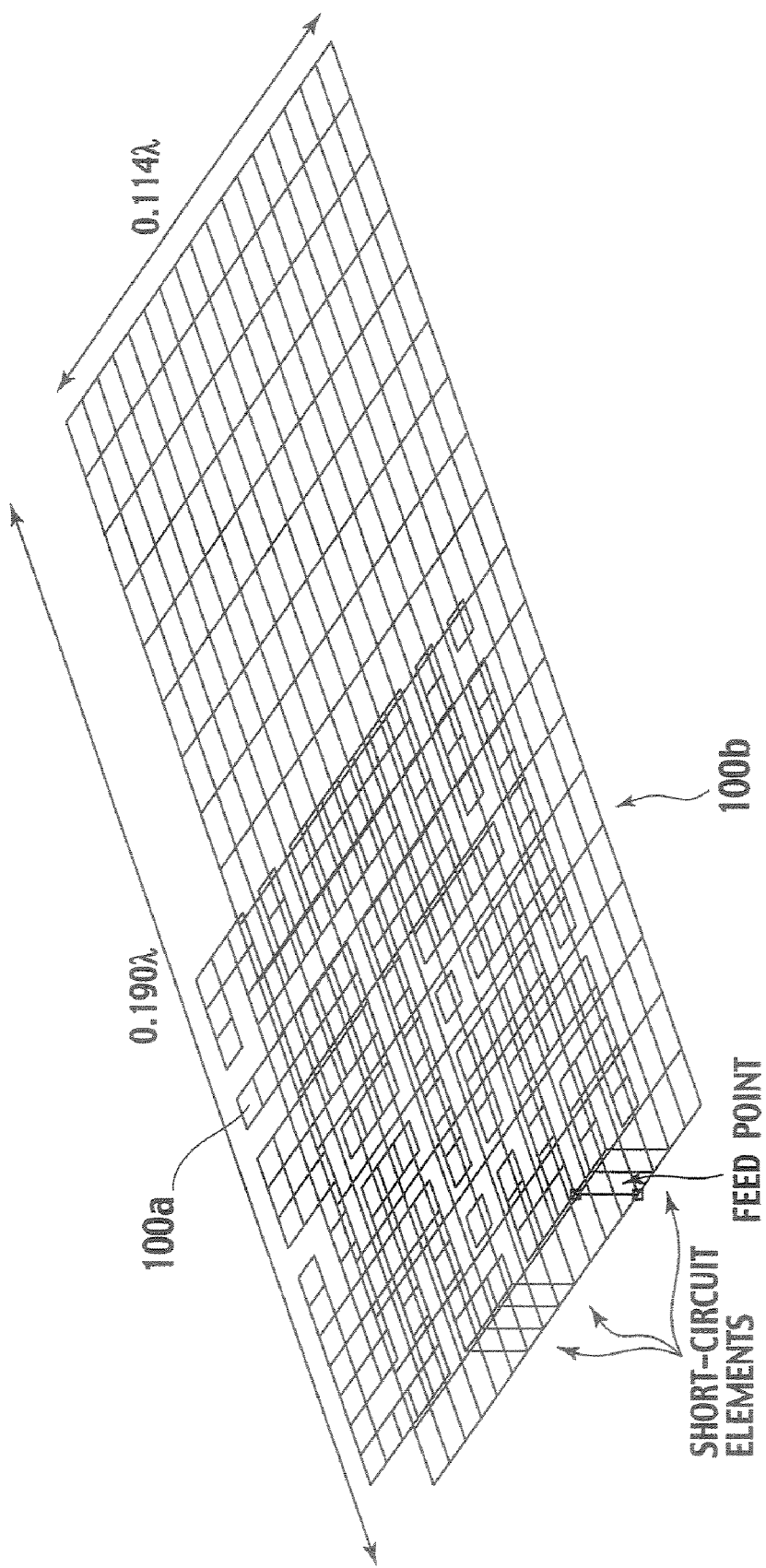
FIG. 23 is a diagram showing an example of a planar inverted-F antenna optimized in the antenna optimum design method according to the third embodiment of the present invention.
Figure 24:
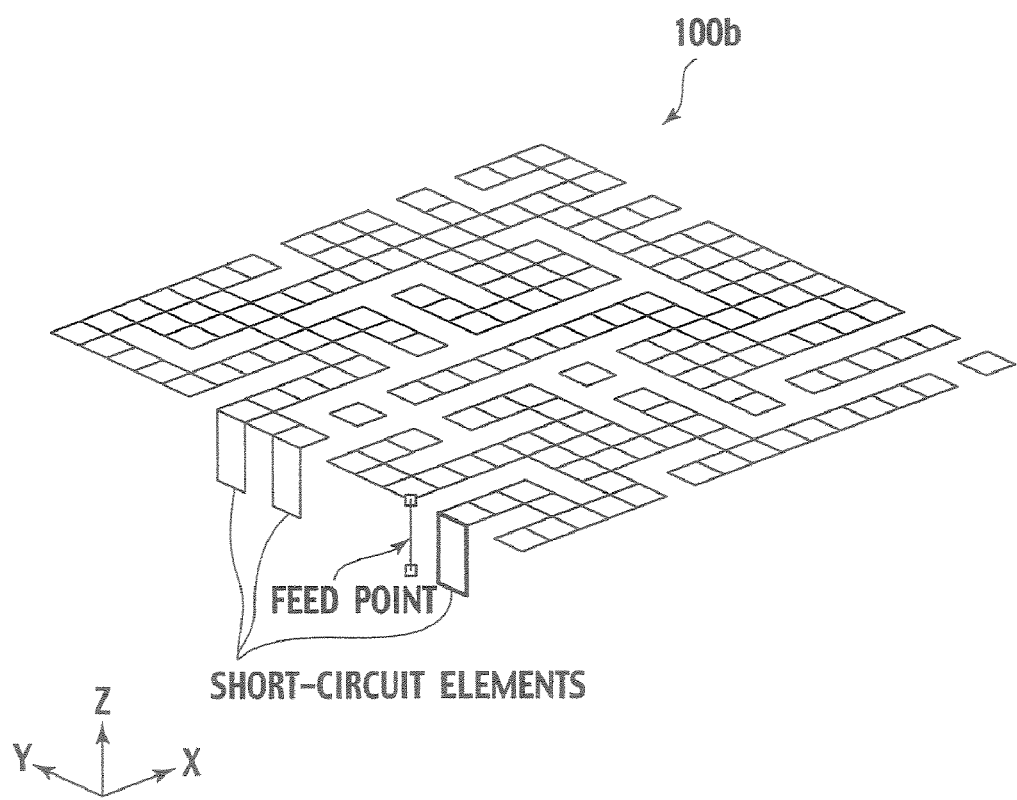
FIG. 24 is a diagram showing an example of an antenna element plane of the planer inverted-F antenna optimized in the antenna optimum design method according to the third embodiment of the present invention.
Figure 25:
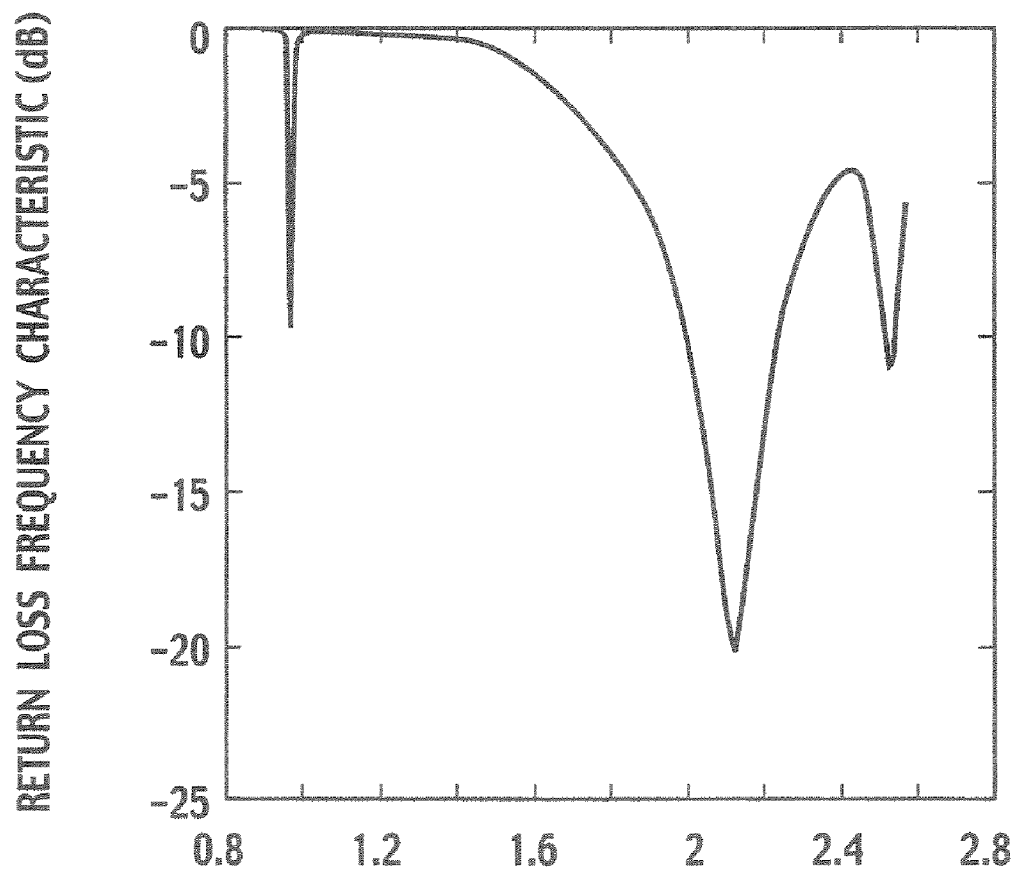
FIG. 25 is a graph showing the characteristics of the planar inverted-F antenna optimized in the antenna optimum design method according to the third embodiment of the present invention.

FIG. 23 shows an example where a planar inverted-F antenna of a size of 0.190 λ×0.114λ is optimized by the antenna optimum design method according to this embodiment. FIG. 24 shows an antenna element plane 100b of the antenna. FIG. 25 shows the characteristics of the antenna.

Modification

Although the above-described embodiments are configured such that a chromosome instructs a way to remove a metal patch in a block contiguous on one side to a reference point block, the present invention is not limited to these embodiments.

Specifically, a chromosome may be configured to instruct a way to place a metal patch in a block contiguous on one side to a reference point block. Meander lines on the antenna element plane 100b may be formed by determining ways to place metal patches in blocks contiguous on one side to reference point blocks, based on chromosomes assigned to the reference point blocks in the above-described step 1004, and sequentially placing metal patches in blocks contiguous to the reference point blocks according to the determined ways to place.

Also, an antenna optimum design method according to this invention may be configured such that a metal patch on an antenna element plane is vertically divided into a three or more odd number and is horizontally divided into an odd number, or is divided into another number (e.g., an even number). Also, an antenna optimum design method according to this invention may be configured such that a metal patch on an antenna element plane is divided into shapes other than rectangles.

Also, an antenna optimum design method according to this invention can be applied to the case of forming a meander line on an unfed element plane in an antenna provided with the unfed element plane in addition to an antenna element plan.

Also, as shown in FIG. 26, an antenna optimum design method according to this invention can be applied to the case where the size of reference point blocks (a to p, Q to T) is different from the size of the other blocks. In this case, an antenna optimum design method according to this invention may be applied after dividing the other blocks to make their size close to that of the reference point blocks (e.g., see A and A1 to A4 shown in FIG. 26).

Also, in an antenna optimum design method according to this invention, blocks constituting the antenna element plane $100b$ may have the same size or may have different sizes.

Operations Of Genetic Algorithm

An example of operations of a genetic algorithm used in the antenna optimum design methods according to the first to third embodiments will be described with reference to FIGS. 19 and 20.

Here, an evaluation function used in the genetic algorithm will be described. In the embodiments, return loss characteristics and gain characteristics at three frequencies f1, f2 and f3 are used as meander-line antenna characteristics.

First, the definition of return loss will be described. A reflection coefficient $\Gamma$ is generally expressed by formula (1):

$$\text{Reflection Coefficient } \Gamma = |Z_{in} - Z_0| / |Z_{in} + Z_0| \tag{1}$$

wherein $Z_{in}$ is an input impedance, and $Z_0$ is a characteristic impedance of a transmission line.

A return loss RLOSS expressed using the reflection coefficient $\Gamma$ is shown in formula (2):

$$RLOSS = -20.0 \log 10(\Gamma) \tag{2}$$

where the return loss RLOSS is a positive value. The return loss RLOSS becomes larger as the reflection coefficient $\Gamma$ becomes smaller. The return loss RLOSS becomes smaller as the reflection coefficient $\Gamma$ becomes larger.

Let $RLOSS_{f1}$, $RLOSS_{f2}$ and $RLOSS_{f3}$ be "return losses" at the desired three frequencies f1, f2 and f3, respectively. Let $Gain_{f1}$, $Gain_{f2}$ and $Gain_{f3}$ be "gains" at the desired three frequencies f1, f2 and f3, respectively.

An evaluation function EVAL for reducing the reflection coefficient $\Gamma$ (that is, increasing the return loss and also reducing the gain in this case is shown in formula (3). Suppose that the evaluation function EVAL is created using a weighted counting method.

$$EVAL = w1 \cdot Rloss_{f1} + w2 \cdot RLOSS_{f2} + w3 \cdot RLOSS_{f3} \cdot w4 \cdot Gain_{f1} + w5 \cdot Gain_{f2} + w6 \cdot Gain_{f3} \tag{3}$$

For example, when optimization is performed with respect to multiple interrelated conditions in the antenna optimum design methods according to the first and second embodiments, as in the case of designing multifrequency shared antennas, it is an effective way that when a certain evaluation item satisfies a desired characteristic, constraints are imposed on the other evaluation items which do not satisfy desired characteristics so as to increase their weight.

Formula (4) shows an evaluation function EVALC created by a constrained weighting factor method as described above:

$$EVALC = w1 \cdot min(DRL_{f1}, Rloss_{f1}) + w2 \cdot min(DRL_{f2}, Rloss_{f2}) + w3 \cdot min(DRL_{f3}, Rloss_{f3}) + w4 \cdot min(DG_{f1}, Gain_{f1}) + w5 \cdot min(DG_{f2}, Gain_{f2}) + w6 \cdot min(DG_{f3}, Gain_{f3}) \tag{4}$$

In formula (4), $DRL_{fi}$ (i=1 to 3) is a desired return loss characteristic at a frequency fi; and $DGfi$ (i=1 to 3) is a desired gain at a frequency fi.

There is a possible alternative method for satisfying conditions for a three-frequency shared antenna, which determine return losses and gains at three frequencies and increases the weight of one having the worst characteristic, thereby making an evaluation function close to a desired value.

Formula (5) and (6) show evaluation functions EVALM-RL and EVALM-G for return loss characteristics and gain characteristics, respectively.

$$EVALM\text{-}RL = min(min(DRL_{f1}, Rloss_{f1}), min(DRL_{f2}, Rloss_{f2}), min(DRL_{f3}, Rloss_{f3})) \tag{5}$$

$$EVALM\text{-}G = min(min(DGf1, Gain_{f1}), min(DG_{f2}, Gain_{f2}), min(DG_{f3}, Gain_{f3})) \tag{6}$$

Formula (7) shows an evaluation function EVAL2 which is a combination of the evaluation function EVALC, the evaluation function EVALM-RL and the evaluation function EVALM-G.

$$EVAL2 = EVALC + w7 \cdot EVALM\text{-}RL + w8 \cdot EVALM\text{-}G \tag{7}$$

A genetic algorithm using the evaluation function EVAL2 will be described below with reference to FIG. 19.

In step S2001, the algorithm randomly generates an initial group of chromosomes. For example, the number of chromosomes (population) in the initial group is 900.

In step S2002, the algorithm calculates meander-line antenna characteristics uniquely determined by the chromosomes, using an electromagnetic analysis means such as the moment method of the FDTD method.

The algorithm then uses the evaluation function EVAL2 to evaluate the characteristics of the meander-line antenna designed based on the chromosomes. Here, return loss characteristics which are considered most important in a multi-frequency shared antenna are weighted more than gain characteristics.

In step S2003, the algorithm selects highly evaluated chromosomes from among the chromosomes.

In step S2004, the algorithm generates new chromosomes (children) each inheriting genes from a plurality of (generally two) chromosomes (parents) by crossover. Here, crossover probability is 0.4, and two-point crossover is used.

In step S2005, the algorithm performs a mutation process on the group of chromosomes, based on mutation provability. Here, the mutation provability is 0.016.

In step S2006, the algorithm determines whether termination conditions are satisfied or not. When the termination conditions are not satisfied, the algorithm repeats alternation of generation until the termination conditions are satisfied (that is, repeats steps S2002 to S2005).

Figure 19:
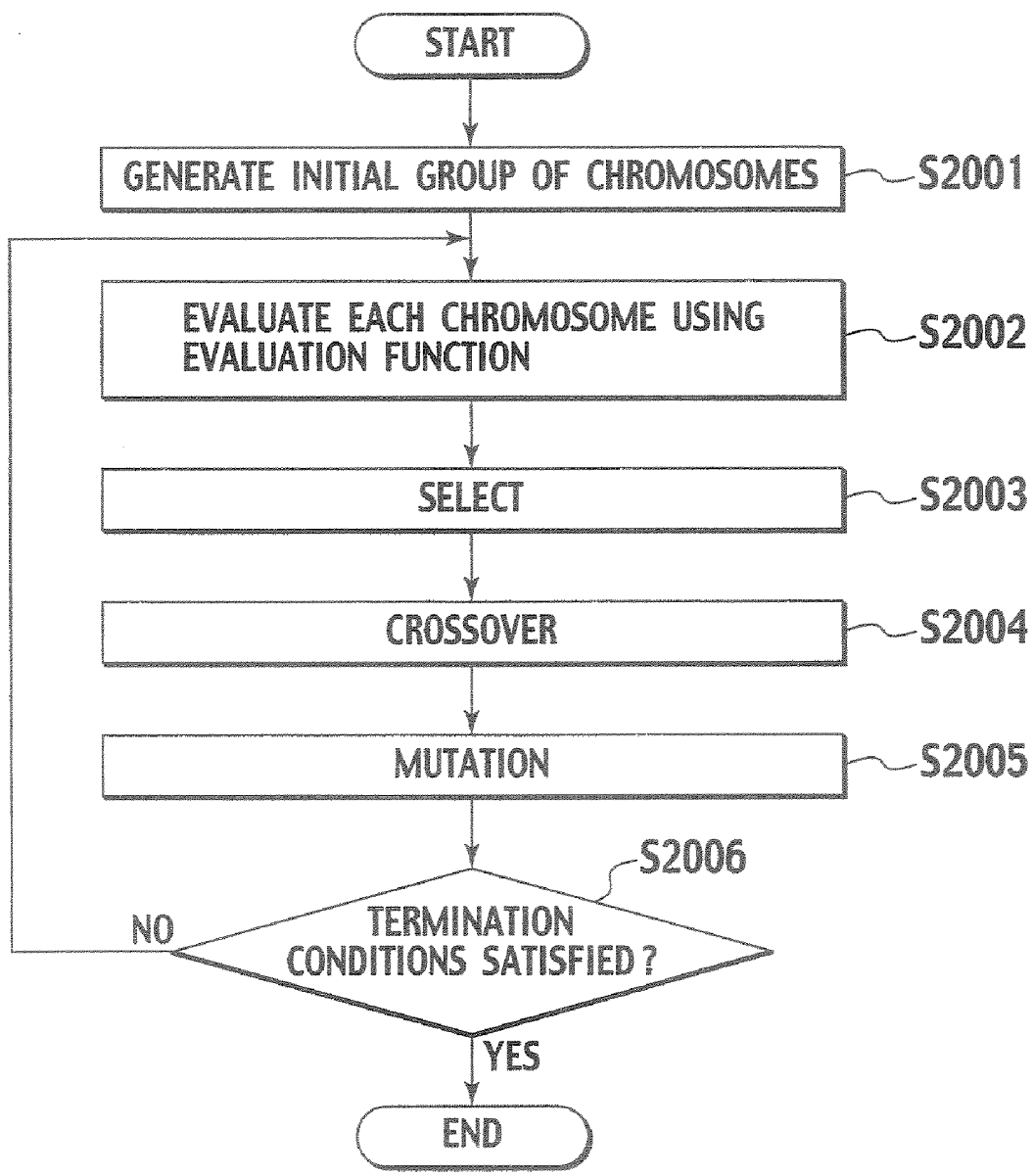
FIG. 19 is a flowchart showing a operations of a genetic algorithm in the antenna optimum design methods according to the first to third embodiments of the present invention.
Figure 20:
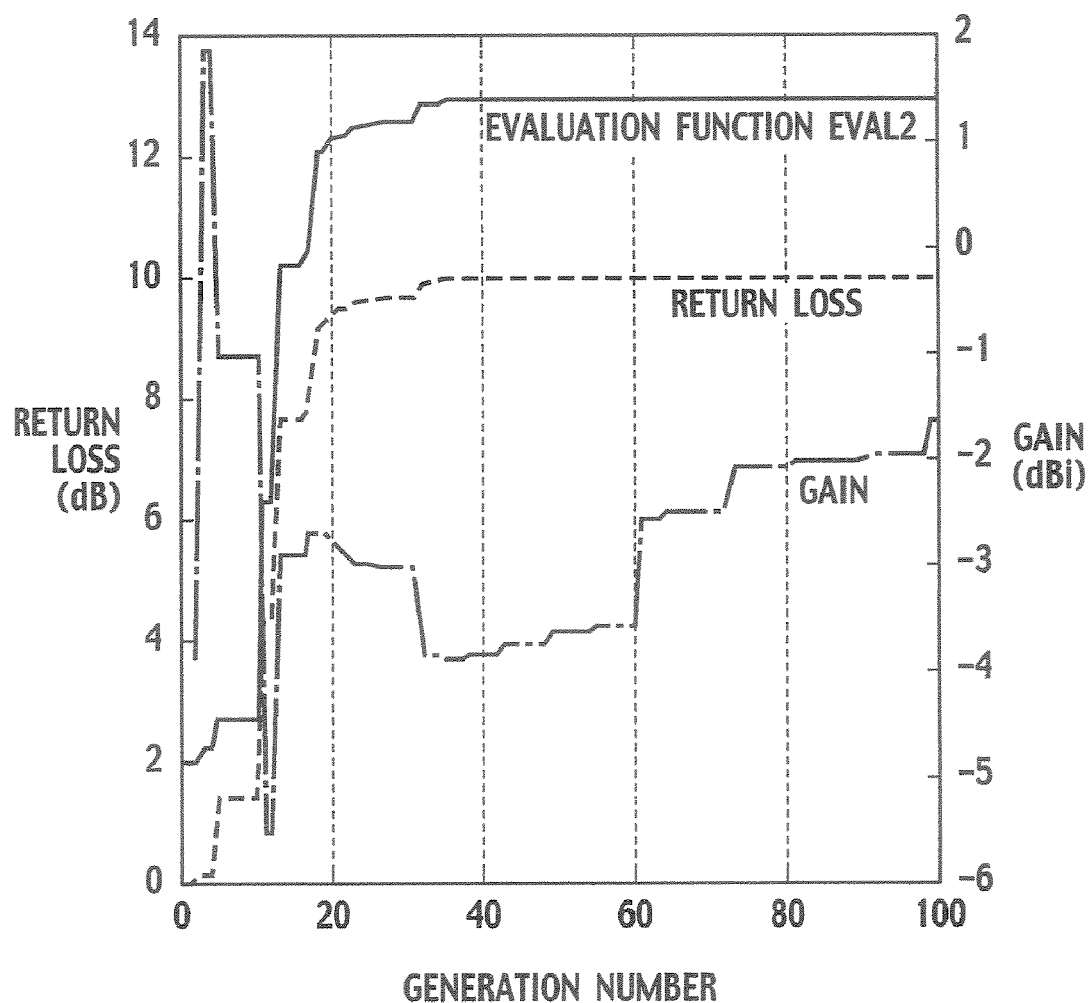
FIG. 20 is a graph showing how return loss characteristics and gain characteristics change by generations by the genetic algorithm in the antenna optimum design methods according to the first to third embodiments of the present invention.

FIG. 20 shows the evaluation function EVAL2, the evaluation function EVALM-RL of the return loss characteristics at the three frequencies, and the evaluation function EVALM-G of the gains at the three frequencies in the genetic algorithm shown in FIG. 19 for each generation.

As shown in FIG. 20, it can be seen that the condition that "the return loss is lower than or equal to −10 dB" is satisfied when the thirtieth generation is passed, and therefore, the gain increases as the generation increases as a result of increasing the weight on the gain characteristics.

Maze Generation Algorithm

The present invention is also applied to various methods using a maze generation algorithm to be described below (such as a circuit generation method), other than antenna optimum design methods using a genetic algorithm as described above.

Specifically, such a maze generation algorithm is a maze generation method for generating a maze, using a genetic algorithm, including the steps of generating blocks by dividing a given plane in vertical and horizontal directions; setting reference point blocks for setting walls in alternate blocks of the generated blocks and assigning chromosomes to the reference point blocks; determining ways to set walls in blocks contiguous on one side to the reference point blocks, based on the chromosomes assigned to the reference point blocks; and searching for optimum chromosomes to be assigned to the reference point blocks by the genetic algorithm to generate an optimum maze.

INDUSTRIAL APPLICABILITY

As described above, the present invention can provide antenna optimum design methods which can exclude structures in which two metal patches are in contact only at a vertex, and can reduce the time of calculating optimum solutions of chromosomes to instruct ways to arrange metal patches, programs for implementing the antenna optimum design methods, and antennas designed by the antenna optimum design methods.

The invention claimed is:

1. A maze generation method for generating a maze, using a genetic algorithm, the method comprising:
   dividing a given plane into shapes to produce generated blocks;
   setting alternate blocks of the generated blocks to be reference point blocks;
   assigning a two-bit chromosome to each reference point block, each two-bit chromosome used for controlling blocks which are set to be contiguous on sides of the reference point blocks; and
   optimizing, by a processor, the chromosomes assigned to the reference point blocks by the genetic algorithm, to generate an optimum maze.

2. An antenna optimum design method for designing a structure of an antenna having a metal patch placed on an antenna element plane, using a genetic algorithm, the method comprising:
   dividing the metal patch on the antenna element plane into blocks to produce generated blocks;
   setting alternate blocks of the generated blocks to be reference point blocks;
   assigning a two-bit chromosome to each reference point block, each two-bit chromosome used for controlling blocks which are arranged to be contiguous on sides of the reference point blocks;
   calculating characteristics of an antenna uniquely determined by the assigned chromosomes; and
   optimizing the chromosomes assigned to the reference point blocks by the genetic algorithm, to optimize characteristics of the antenna.

3. The antenna optimum design method as set forth in claim 2, wherein
   the antenna includes an unfed element plane formed in parallel with the antenna element plane with a metal patch placed on a surface thereof, and
   the metal patches on the antenna element plane and the unfed element plane are divided into given shapes in the dividing.

4. The antenna optimum design method as set forth in claim 2, wherein
   the antenna includes a ground plane with a metal surface, a short-circuit element for short-circuiting the metal patch on the antenna element plane and the metal surface on the ground plane, and a feed point connected to the ground plane for feeding the metal patch on the antenna element plane, and
   the metal patch is placed in a block to which the short-circuit element and the feed point are connected.

5. The antenna optimum design method as set forth in claim 2, wherein
   the antenna includes a ground plane with a metal surface and a short-circuit element plane with a metal patch placed on a surface thereof,
   the metal patch placed on the short-circuit element plane constitutes a short-circuit element for short-circuiting the metal patch on the antenna element plane and the metal surface on the ground plane, and
   the metal patches on the antenna element plane and the short-circuit element plane are divided into given shapes to produce the generated blocks in the dividing.

6. The antenna optimum design method as set forth in claim 5, wherein
   the antenna includes a feed point with a central conductor connected to the metal patch on the antenna element plane and an outer conductor connected to the metal surface on the ground plane, and
   the chromosomes include a position coordinate of the feed point on the short-circuit element plane.

7. The antenna optimum design method as set forth in claim 2, wherein
   return loss characteristics and gain characteristics at multiple frequencies are used as the antenna characteristics.

8. The antenna optimum design method as set forth in claim 2, wherein
   when it is decided that all metal patches in blocks surrounding a generated block be removed in the optimizing, it is decided that a metal patch in the generated block be removed.

9. The antenna optimum design method as set forth in claim 2, wherein
   when it is decided that not all metal patches in blocks surrounding a generated block be removed in the optimizing, it is decided that a metal patch in the generated block not be removed.

10. A non-transitory computer readable storage medium storing computer readable instructions thereon that, when executed by a processor, direct the processor to implement an antenna optimum design method for designing a structure of an antenna, comprising:
    dividing a metal patch on an antenna element plane into blocks to produce generated blocks;
    setting alternate blocks of the generated blocks to be reference point blocks;
    assigning a two-bit chromosome to each reference point block, each two-bit chromosome used for controlling blocks which are arranged to be contiguous on sides of the reference point blocks;
    calculating characteristics of an antenna uniquely determined by the assigned chromosomes; and
    optimizing the chromosomes assigned to the reference point blocks by the genetic algorithm, to optimize characteristics of the antenna.

11. An antenna designed by an antenna optimum design method, comprising:
    dividing a metal patch on an antenna element plane into blocks to produce generated blocks;
    setting alternate blocks of the generated blocks to be reference point blocks;

assigning a two-bit chromosome to each reference point block, each two-bit chromosome used for controlling blocks which are arranged to be contiguous on sides of the reference point blocks;

calculating characteristics of an antenna uniquely determined by the assigned chromosomes; and optimizing the chromosomes assigned to the reference point blocks by the genetic algorithm, to optimize characteristics of the antenna.

12. The maze generation method for generating a maze of claim 1, wherein setting alternate blocks of the generated blocks includes setting blocks in alternate rows of alternate columns of the generated blocks to be reference point blocks, assigning a chromosome to each reference point block includes assigning a two-bit chromosome to each reference point block, and sides of the reference point blocks include walls in the maze generation method.

13. The maze generation method for generating a maze of claim 1, wherein optimizing the chromosomes assigned to the reference point blocks includes searching, by a genetic algorithm, optimized values of the chromosomes assigned to the reference point blocks, to optimize the characteristics of a meander-line antenna according to maximum and minimum values of an evaluation function.

* * * * *